US012572014B2

(12) United States Patent
Cole et al.

(10) Patent No.: US 12,572,014 B2
(45) Date of Patent: Mar. 10, 2026

(54) FIELD OF VIEW OPTIMIZATION

(71) Applicant: Envisics Ltd, Milton Keynes (GB)

(72) Inventors: Alexander Cole, Milton Keynes (GB);
Timothy Smeeton, Milton Keynes
(GB)

(73) Assignee: Envisics Ltd., Milton Keynes (GB)

( * ) Notice: Subject to any disclaimer, the term of this
patent is extended or adjusted under 35
U.S.C. 154(b) by 730 days.

(21) Appl. No.: 17/862,713

(22) Filed: Jul. 12, 2022

(65) Prior Publication Data

US 2023/0101295 A1 Mar. 30, 2023

(30) Foreign Application Priority Data

Aug. 26, 2021 (GB) ..................................... 2112219

(51) Int. Cl.
*G02B 27/01* (2006.01)
*G02B 5/32* (2006.01)
*G06F 3/01* (2006.01)

(52) U.S. Cl.
CPC ........... *G02B 27/0103* (2013.01); *G02B 5/32*
(2013.01); *G02B 27/0179* (2013.01); *G06F*
*3/013* (2013.01); *G02B 2027/0123* (2013.01);
*G02B 2027/0187* (2013.01)

(58) Field of Classification Search
CPC .. G02B 27/0103; G02B 5/32; G02B 27/0179;
G02B 2027/0123; G02B 2027/0187;
G02B 27/0101; G02B 2027/015; G02B
2027/0185; G02B 27/01; G02B 27/0172;
G02B 2027/0105; G02B 2027/0107;
G02B 2027/0109; G02B 2027/0174;
(Continued)

(56) References Cited

U.S. PATENT DOCUMENTS

| | | | | |
|---|---|---|---|---|
| 5,760,931 A | * | 6/1998 | Saburi | ................ G02B 27/0149 |
| | | | | 359/13 |
| 2011/0157667 A1 | | 6/2011 | Lacoste et al. | |

(Continued)

FOREIGN PATENT DOCUMENTS

| | | | | |
|---|---|---|---|---|
| CN | 110554497 A | * | 12/2019 | ......... G02B 27/0101 |
| CN | 112204433 A | | 1/2021 | |

(Continued)

OTHER PUBLICATIONS

Combined Search and Examination Report issued in GB 2 112
219.7 on May 20, 2022 (11 pages).

(Continued)

*Primary Examiner* — Collin X Beatty
(74) *Attorney, Agent, or Firm* — Akerman LLP

(57) ABSTRACT

Systems and methods disclosed herein include, among other
aspects, a head-up display comprising an eye-box having a
first dimension and a second dimension, where the head-up
display is arranged to form first image content in a first
image area at a first image area distance from the eye-box
and second image content in a second image area at a second
image area distance from the eye-box, where the first image
area distance is less than the second image area distance and
the first image area is at least partially overlapping in the first
dimension with the second image area, and where the second
image area extends less far in angular space than the first
image area in at least one direction of the first dimension.

19 Claims, 19 Drawing Sheets

(58) Field of Classification Search
CPC ..... G02B 27/0093; G06F 3/013; B60K 35/00; B60K 35/23; G03H 1/20
See application file for complete search history.

(56) References Cited

U.S. PATENT DOCUMENTS

| | | | |
|---|---|---|---|
| 2017/0248750 | A1 | 8/2017 | Curtis et al. |
| 2018/0284585 | A1 | 10/2018 | Trisnadi et al. |
| 2019/0339535 | A1 | 11/2019 | Abi-Chaaya |
| 2020/0166754 | A1 | 5/2020 | Leister et al. |
| 2020/0249479 | A1 | 8/2020 | Hirata |
| 2021/0003839 | A1 | 1/2021 | Huang |
| 2023/0041447 | A1 | 2/2023 | Huber |

FOREIGN PATENT DOCUMENTS

| | | | |
|---|---|---|---|
| EP | 3026483 | A1 | 7/2014 |
| EP | 3851899 | A1 | 7/2021 |
| KR | 10-2021-0001974 | | 1/2021 |
| WO | WO 2018160765 | A1 | 9/2018 |
| WO | 2021160325 | A1 | 8/2021 |
| WO | WO 2022/046354 | A1 | 3/2022 |

OTHER PUBLICATIONS

Office Action issued in Korean Patent App. 10-2022-0094224 on Jun. 24, 2024 (9 pages).
English translation of Office Action issued in Korean Patent App. 10-2022-0094224 on Jun. 24, 2024 (9 pages).
Examination Report issued in GB 2112219.7 on Jul. 13, 2023 (3 pages).
Office Action mailed on May 30, 2025 in Chinese Application CN 202210915243.2 (8 pages).
English translation of Office Action mailed on May 30, 2025 in Chinese Application CN 202210915243.2 (8 pages).

* cited by examiner

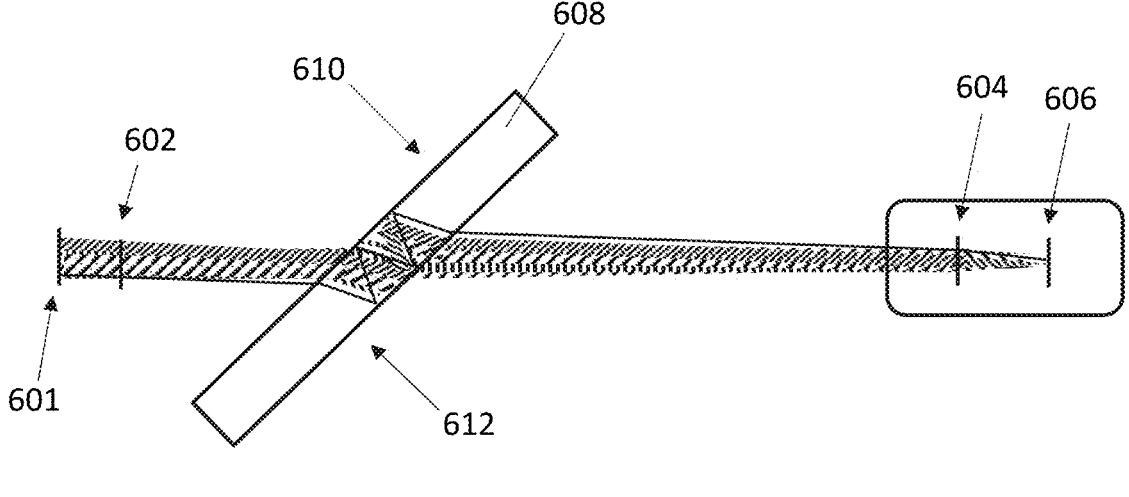
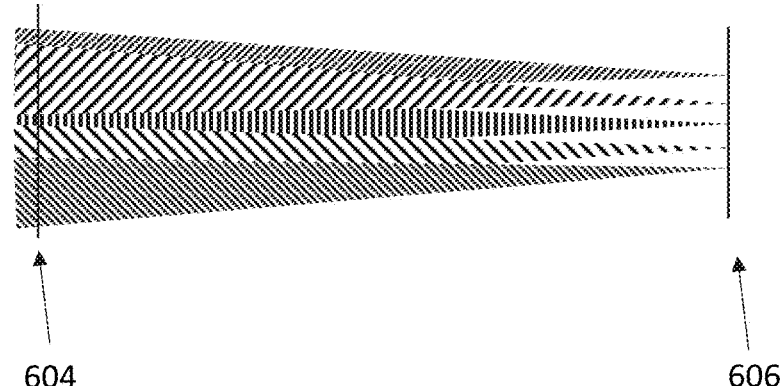
FIGURE 6A

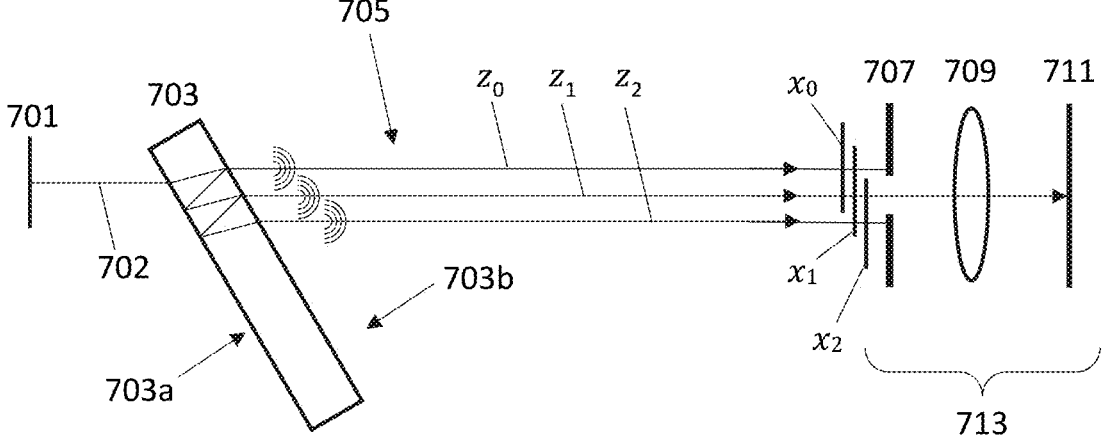
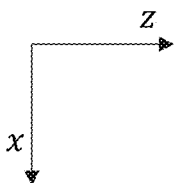
FIGURE 7

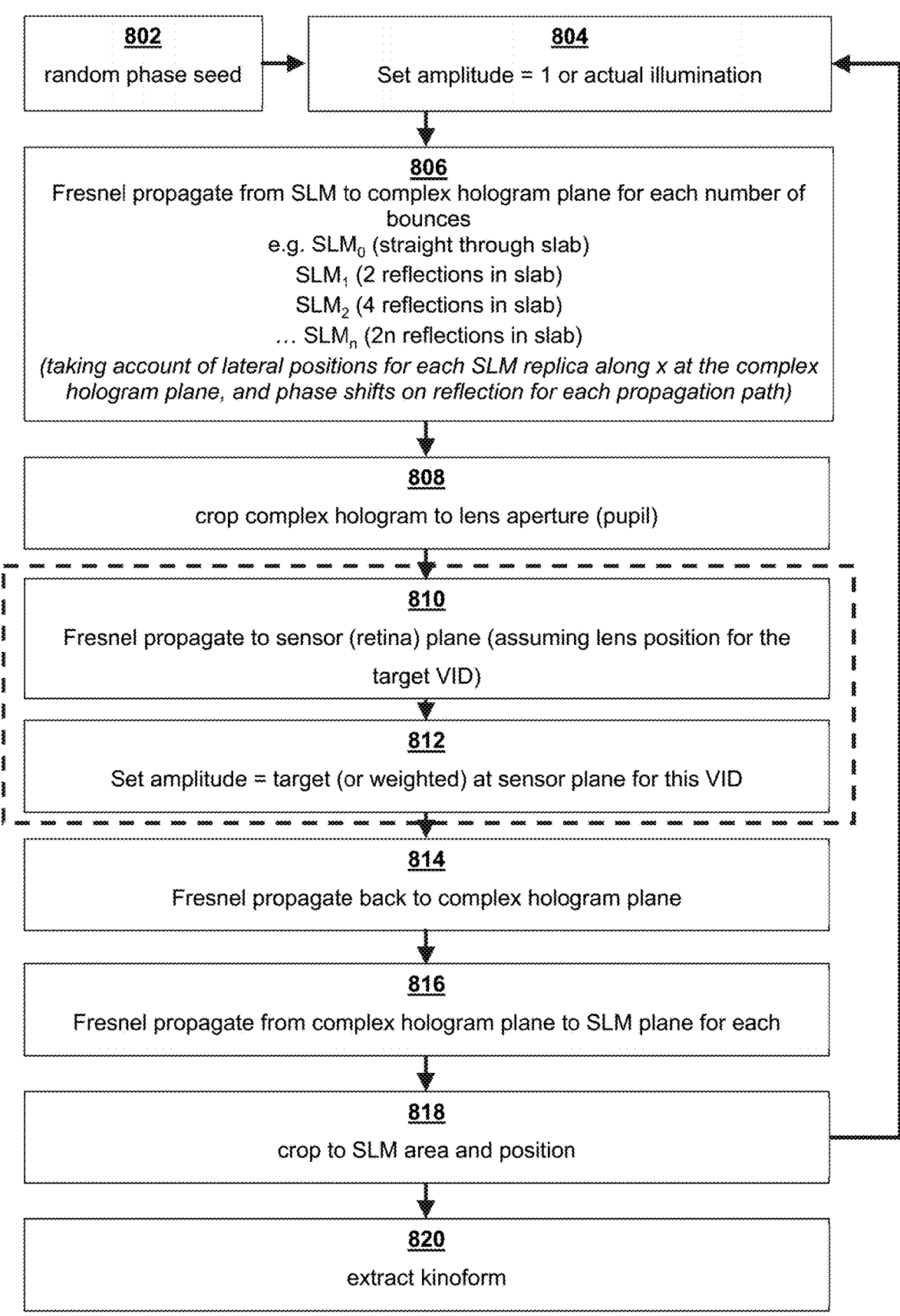

802
random phase seed

804
Set amplitude = 1 or actual illumination

806
Fresnel propagate from SLM to complex hologram plane for each number of bounces
e.g. $SLM_0$ (straight through slab)
$SLM_1$ (2 reflections in slab)
$SLM_2$ (4 reflections in slab)
... $SLM_n$ (2n reflections in slab)
*(taking account of lateral positions for each SLM replica along x at the complex hologram plane, and phase shifts on reflection for each propagation path)*

808
crop complex hologram to lens aperture (pupil)

810
Fresnel propagate to sensor (retina) plane (assuming lens position for the target VID)

812
Set amplitude = target (or weighted) at sensor plane for this VID

814
Fresnel propagate back to complex hologram plane

816
Fresnel propagate from complex hologram plane to SLM plane for each

818
crop to SLM area and position

820
extract kinoform

FIELD OF VIEW OPTIMIZATION

CROSS-REFERENCE TO RELATED APPLICATIONS

This application claims priority under 35 U.S.C. § 119 to GB 2112219.7, titled "Field of View Optimisation," filed on Aug. 26, 2021. The entire contents of GB 2112219.7 are incorporated by reference herein for all purposes.

FIELD

The present disclosure relates to an image projector and a method of image projection. Some embodiments relate to a holographic projector and a method of holographic projection. More specifically, the present disclosure relates to projection of a plurality of images. The present disclosure also relates to a device arranged to form virtual images using an optical combiner and a method of forming a plurality of images using an optical combiner. Embodiments relate to a head-up display and a method of head-up display. Some embodiments relate to a picture generating unit for a head-up display for a vehicle. Other embodiments relate to a method of optimizing the field of view of images formed by an image projector such as a method of cropping or expanding the field of view of one image of a plurality of images formed at substantially the same time on different image planes.

INTRODUCTION

Light scattered from an object contains both amplitude and phase information. This amplitude and phase information can be captured on, for example, a photosensitive plate by well-known interference techniques to form a holographic recording, or "hologram", comprising interference fringes. The hologram may be reconstructed by illumination with suitable light to form a two-dimensional or three-dimensional holographic reconstruction, or replay image, representative of the original object.

Computer-generated holography may numerically simulate the interference process. A computer-generated hologram may be calculated by a technique based on a mathematical transformation such as a Fresnel or Fourier transform. These types of holograms may be referred to as Fresnel/Fourier transform holograms or simply Fresnel/Fourier holograms. A Fourier hologram may be considered a Fourier domain/plane representation of the object or a frequency domain/plane representation of the object. A computer-generated hologram may also be calculated by coherent ray tracing or a point cloud technique, for example.

A computer-generated hologram may be encoded on a spatial light modulator arranged to modulate the amplitude and/or phase of incident light. Light modulation may be achieved using electrically-addressable liquid crystals, optically-addressable liquid crystals or micro-mirrors, for example.

A spatial light modulator typically comprises a plurality of individually-addressable pixels which may also be referred to as cells or elements. The light modulation scheme may be binary, multilevel or continuous. Alternatively, the device may be continuous (i.e., is not comprised of pixels) and light modulation may therefore be continuous across the device. The spatial light modulator may be reflective meaning that modulated light is output in reflection. The spatial light modulator may equally be transmissive meaning that modulated light is output in transmission.

A holographic projector may be provided using the system described herein. Such projectors have found application in head-up displays, "HUD", and light detection and ranging, "LIDAR", for example.

SUMMARY

The present disclosure and drawings generally show one-dimensional cases for ease of explanation and illustration. However, the person skilled in the art of optics will appreciate that the concepts described and shown may extend in two-dimensions to provide two-dimensional images from two-dimensional holograms. For example, whilst only one-dimensional pupil expansion may be described and shown, the reader should appreciate that the present disclosure extends to two-dimensional pupil expansion—e.g., using two one-dimensional pupil expanders in series.

Broadly, the present disclosure relates to image projection. It relates to a method of image projection and an image projector which comprises a display device. The present disclosure also relates to a projection system comprising the image projector and a viewing system. The present disclosure is equally applicable to a monocular and binocular viewing system. The viewing system may comprise a viewer's eye or eyes. The viewing system comprises an optical element having optical power (e.g., lens/es of the human eye) and a viewing plane (e.g., retina of the human eye/s). The projector may be referred to as a 'light engine'. The display device and the image formed (or perceived) using the display device are spatially separated from one another. The image is formed, or perceived by a viewer, on a display plane. In some embodiments, the image is a virtual image and the display plane may be referred to as a virtual image plane. The image is formed by illuminating a diffractive pattern (e.g., hologram) displayed on the display device.

The display device comprises pixels. The pixels of the display device diffract light. In accordance with well-understood optics, the magnitude of the maximum diffraction angle is determined by the size of the pixels (and other factors such as the wavelength of the light).

In embodiments, the display device is a spatial light modulator such as liquid crystal on silicon ("LCOS") spatial light modulator (SLM). Light propagates over a range of diffraction angles (for example, from zero to the maximum diffractive angle) from the LCOS, towards a viewing entity/system such as a camera or an eye. In some embodiments, magnification techniques may be used to increase the range of available diffraction angles beyond the conventional maximum diffraction angle of an LCOS.

In embodiments, the image is a real image. In other embodiments, the image is a virtual image that is perceived by a human eye (or eyes). The projection system, or light engine, may thus be configured so that the viewer looks directly at the display device. In such embodiments, light encoded with the hologram is propagated directly to the eye(s) and there is no intermediate holographic reconstruction formed, either in free space or on a screen or other light receiving surface, between the display device and the viewer. In such embodiments, the pupil of the eye may be regarded as being the entrance aperture (or "entrance pupil") of the viewing system and the retina of the eye may be regarded as the viewing plane of the viewing system. It is sometimes said that, in this configuration, the lens of the eye performs a hologram-to-image conversion.

In accordance with the principles of well-understood optics, the range of angles of light propagating from a display device that can be viewed, by an eye or other viewing entity/system, varies with the distance between the display device and the viewing entity. At a 1 meter viewing distance, for example, only a small range of angles from an LCOS can propagate through an eye's pupil to form an image at the retina for a given eye position. The range of angles of light rays that are propagated from the display device, which can successfully propagate through an eye's pupil to form an image at the retina for a given eye position, determines the portion of the image that is 'visible' to the viewer. In other words, not all parts of the image are visible from any one point on the viewing plane (e.g., any one eye position within a viewing window such as eye-motion box.)

In some embodiments, the image perceived by a viewer is a virtual image that appears upstream of the display device—that is, the viewer perceives the image as being further away from them than the display device. Conceptually, it is possible to consider a plurality of different virtual image points of a virtual image. The distance from a virtual point to the viewer is referred to herein as a virtual image distance, for that virtual image point. Different virtual points may, of course, have different virtual image distances. Individual light rays, within ray bundles associated with each virtual point, may take different respective optical paths to the viewer, via the display device. However, only some parts of the display device, and therefore only some of the rays from one or more virtual points of a virtual image, may be within the user's field of view. In other words, only some of the light rays from some of the virtual points on the virtual image will propagate, via the display device, into the user's eye(s) and thus will be visible to the viewer. Conceptually, it may therefore be considered that the viewer is looking at a virtual image through an 'display device-sized window', which may be very small, for example 1 cm in diameter, at a relatively large distance, e.g., 1 meter. And the user will be viewing the display device-sized window via the pupil(s) of their eye(s), which can also be very small. Accordingly, the field of view becomes small and the specific angular range that can be seen depends heavily on the eye position, at any given time.

Each image point of an image may have a different image distance but, in accordance with embodiments, each image is formed in an image area and so an "image area distance" can be associated with each image, wherein an image area distance is the length of the shortest straight line joining the center of the eye-box and a plane containing the image area.

A pupil expander addresses the problem of how to increase the field of view—i.e., how to increase the range of angles of light rays that are propagated from the display device, and which can successfully propagate through an eye's pupil to form an image. The display device is (in relative terms) small and the projection distance is (in relative terms) large. In some embodiments, the projection distance is at least one—such as, at least two-orders of magnitude greater than the diameter, or width, of the entrance pupil and/or aperture of the display device (i.e., size of the array of pixels). The present disclosure relates to so-called direct view holography in which a hologram of an image is propagated to the human eye rather than the image itself. In other words, the light received by the viewer is modulated according to a hologram of the image.

The pupil expander increases the field of view and therefore increase the maximum propagation distance over which the full diffractive angle of the display device may be used. Use of a pupil expander can also increase the user's eye-box laterally, thus enabling some movement of the eye/s to occur, whilst still enabling the user to see the image. In embodiments, the pupil expander is a waveguide pupil expander. The present disclosure generally relates to non-infinite virtual image distances—that is, near-field virtual images.

Embodiments describe pupil expansion in one-dimension but the present disclosure extends to two-dimensional pupil expansion using, for example, a first elongate waveguide to expand in a first dimension and second waveguide to expand in the second, perpendicular dimension.

Aspects of the present disclosure are defined in the appended independent claims.

There is provided a head up display comprising an eye-box. The eye-box or eye-motion-box has a first dimension and second dimension. The head-up display is arranged to form a first image in a first image area at a first image area distance from the eye-box. The head-up display is further arranged to form a second image in a second image area at a second image area distance from the eye-box. An image area distance is a distance (in a direction) perpendicular to a plane containing the first dimension and second dimension. The first image and second image may be formed at substantially the same time, for example, from the same display event or in the same display interval. Alternatively, the first image and second image may be formed in rapid succession, for example, using time interlacing. The first image area distance is less than the second image area distance. The first image may be referred to as a near image or near-field image. The second image may be referred to as a far image or far-field image. The first image area is at least partially overlapping in the first dimension with the second image area. The overlap may be an overlap in angular space from the center of the eye-box. The overlap may be apparent when viewed from the eye-box such as from the center of the eye-box. The second image area extends less far in angular space than the first image area in at least one direction of the first dimension. In some embodiments, the second image area is cropped on at least one side so that the second image area extends less far than the first image area. The field of view of the second image area is less than the field of view of the first image area in at least one direction of the first dimension.

The far-field/second image area is further from the eye-box than the near-field/first image area. It may be said that the image area distance associated with second image area is greater than that of the first image area. As described herein, in a holographic head-up display, image content is displayed on a replay field of a replay plane, wherein the replay field is an area that can receive light from the displayed hologram. The skilled reader will appreciate that the maximum size of the replay field is determined by the diffraction angle of the display device (e.g., LCOS). Thus, it may be said that the first image area is an area of a first replay field at the first image area distance where the first image/image content is formed and the second image area is an area of a second replay field at the second image area distance where the second image/image content is formed. When an image is displayed, the area of the replay field that displays the image/image content is dependent upon (where light is received from) the displayed hologram.

A key characteristic of a head-up display is its field of view that defines the size of the area in which image content may be displayed. The inventors identified that even if the field of view (i.e., size in angular space) of the far-field image is the same as that of the near-field image, the far field image places a greater demand than the near-field image for clearance space (or volume) within the system (e.g., vehicle) housing the head-up display owing to the size of the light ray bundle required to form the far image at each viewing position within the eye-box. The inventors discovered that this greater demand is typically due to the extreme eye-box positions (e.g., peripheral eye-box positions). This volume of space is required so that there is a clear path for the light rays forming the near-field and far-field image for all eye-box positions. This volume of space may therefore be identified from the light ray bundles required to form the plurality of images for each respective eye-box position. The person skilled in the art of head-up display design is familiar with how the size (i.e., spatial extent) of the light ray bundle for each eye-box position is crucial in determining how the head-up display may be integrated into a vehicle (e.g., how the head-up display may be "packaged" under the dashboard).

The eye-box may be a two-dimensional area, e.g., viewing window. The eye-box therefore has a first dimension (e.g., width) and second dimension (e.g., height). The terms "width" and "height" may be used to refer to dimensions from the perspective of a viewer of the head-up display such as a driver of a vehicle comprising the head-up display. The width may be termed a "horizontal dimension" and the height may be termed a "vertical dimension". For example, the eye-box may be contained on an xy plane, wherein the z-direction is the optical axis or viewing axis of the head-up display. Reference is made herein to "directions" of each dimension to refer to positive and negative directions of the dimension, for example, the positive and negative x directions of the horizontal dimension.

In embodiments, the first and second dimension of the eye-box are aligned with the first and second dimension, respectively, of the first and second image. That is, the first dimension of the eye-box is parallel to a first dimension of the first image and first dimension of the second image. Likewise, the second dimension of the eye-box is parallel to a second dimension of the first image and second dimension of the second image. The eye-box, first image and second image may each be longer in the first dimension than the second dimension.

Reference is made herein to "angular space" as a way of defining the size of aspects or features of the head-up display such as an image area or a light ray bundle forming at least one image in at least one image area. Angular space is typically considered in different planes of the optical system such as two orthogonal planes, e.g., the xz plane and yz plane. An angular space may therefore be defined as a first angle on a first plane and a second angle on a second plane, wherein the second plane is orthogonal to the first plane. The angular space of a feature is defined by an angle from a point in the eye-box (e.g., the center of the eye-box) to an extremity or boundary of the feature. By way of example only, in some embodiments, the horizontal field of view of the first image area is +/−10 degrees from every point in the eye-box—that is, +10 degree in one direction of the horizontal dimension and −10 degrees in the other direction of the horizontal dimension—and the vertical field of view of the first image area is +/−5 degrees from every point in the eye-box—that is, +5 degree in one direction of the vertical dimension and −5 degrees in the other direction of the vertical dimension. Unless specifically stated to the contrary, reference herein to a field of view of an image area should be taken to mean an area defined, in angular space from the eye-box, by a first angle on a first plane containing viewing axis and a second angle on a second plane containing the viewing axis, wherein the first plane is orthogonal to the second plane and said field of view is achieved for every point in the eye-box. The first plane may contain the first dimension and the second plane may contain the second dimension. In some embodiments, the eye-box, first image area and second image area are planar. In some embodiments, the eye-box, first image area and second image area are three substantially parallel planes on a viewing axis of the head-up display. In some embodiments, the eye-box, first image and second image are coaxial and, optionally, substantially orthogonal to that axis.

In accordance with this disclosure, the second image area extends less far, in angular space, than the first image area in at least one direction of the first dimension. For example, the vertical field of view of the second image area is less than that of the first image area on one side/vertical extremity. A technical advancement achieved is that the clearance volume required by image light of the head-up display is significantly reduced. Specifically, the inventors identified that cropping/reducing the size or extent of the second image area (compared to the first image area) on at least one side can be sufficient to avoid critical clashes between light rays of the head-up display and the host vehicle or volume of space within the dashboard of the host vehicle that is typically allocated to the head-up display. Moreover, the inventors further identified that, in some practical cases, the size or extent of the first image area (e.g., the vertical field of view) may actually be increased in accordance with a desired field of view of the second image area without consequence.

In some embodiments, a hologram is propagated to the viewing system/s not a holographic reconstruction (i.e., image) formed from the hologram. It may be said that the spatially modulated light received by the viewing system/s is in the hologram domain rather than the spatial or image domain. It may also be said that the viewing system/s performs the hologram to image transform. More specifically, an optical element such as lens of each viewing system performs the transformation. In embodiments, a holographic reconstruction or image is not formed between the display device and viewing system/s. In some embodiments, a different hologram is calculated and propagated to each eye of a viewer, optionally, using an interlacing scheme.

The display device has an active or display area having a first dimension that may be less than 10 cms such as less than 5 cms or less than 2 cms. The propagation distance between the display device and viewing system may be greater than 1 m such as greater than 1.5 m or greater than 2 m. The optical propagation distance within the waveguide may be up to 2 m such as up to 1.5 m or up to 1 m. The method may be capable of receiving an image and determining a corresponding hologram of sufficient quality in less than 20 ms such as less than 15 ms or less than 10 ms.

In some embodiments, a hologram is configured to route light into a plurality of channels, each channel corresponding to a different part (i.e., sub-area) of an image. In some embodiments, the light channels are non-overlapping. In other embodiments—for example, those additionally including an optical combiner having optical power (e.g., vehicle windscreen) between the waveguide and viewer— some light channels may at least partially overlap. However, it is not essential that this type of hologram is used, and the present disclosure is equally applicable to any method of forming a first image and second image, as set out in the appended claims. In some embodiments, a hologram is represented, such as displayed, on the display device— which may be a spatial light modulator such as a liquid crystal on silicon spatial light modulator. When displayed on an appropriate display device, the hologram may spatially modulate light transformable by a viewing system into the image. The channels formed by the diffractive structure are referred to herein as "hologram channels" merely to reflect that they are channels of light encoded by the hologram with image information. It may be said that the light of each channel is in the hologram domain rather than the image or spatial domain. In some embodiments, the hologram is a Fourier or Fourier transform hologram and the hologram domain is therefore the Fourier or frequency domain. The hologram may equally be a Fresnel or Fresnel transform hologram. The hologram is described herein as routing light into a plurality of hologram channels merely to reflect that the image reconstructable from the hologram has a finite size and can be arbitrarily divided into a plurality of image sub-areas, wherein each hologram channel would correspond to each image sub-area. Importantly, this hologram is characterised by how it distributes the image content when illuminated. Specifically, the hologram divides the image content by angle. That is, each point on the image is associated with a unique light ray angle in the spatially modulated light formed by the hologram when illuminated—at least, a unique pair of angles because the hologram is two-dimensional. For the avoidance of doubt, this hologram behaviour is not conventional. The spatially modulated light formed by this special type of hologram, when illuminated, may be arbitrarily divided into a plurality of hologram channels, wherein each hologram channel is defined by a range of light ray angles (in two-dimensions). It will be understood from the foregoing that any hologram channel (i.e., sub-range of light ray angles) that may be considered in the spatially modulated light will be associated with a respective part or sub-area of the image. That is, all the information needed to reconstruct that part or sub-area of the image is contained within a sub-range of angles of the spatially modulated light formed from the hologram of the image. When the spatially modulated light is observed as a whole, there is not necessarily any evidence of a plurality of discrete light channels. However, in some embodiments, a plurality of spatially separated hologram channels is formed by intentionally leaving areas of the target image, from which the hologram is calculated, blank or empty (i.e., no image content is present).

Nevertheless, this type of hologram may still be identified. For example, if only a continuous part of sub-area of the spatially modulated light formed by the hologram is reconstructed, only a sub-area of the image should be visible. If a different, continuous part or sub-area of the spatially modulated light is reconstructed, a different sub-area of the image should be visible. A further identifying feature of this type of hologram is that the shape of the cross-sectional area of any hologram channel substantially corresponds to (i.e., is substantially the same as) the shape of the entrance pupil although the size may be different. Each light hologram channel propagates from the hologram at a different angle or range of angles. Whilst these are example ways of characterising or identifying this type of hologram, other ways may be used. In summary, the hologram disclosed herein is characterised and identifiable by how the image content is distributed within light encoded by the hologram, and the appended claims are set out accordingly.

In embodiments, the second image area extends less far (in angular space from all positions within the eye-box) than the first image area in both directions of the first dimension. Accordingly, the total size of the second image area in angular space is no more than, such as less than, that of the first image area.

In accordance with these embodiments, the far-field image does not necessitate any additional clearance within the vehicle that houses the head-up display. This is because the light rays forming the far-field image can be entirely accommodated within the volume needed for the near-field image.

The first image and second image may be formed (substantially) simultaneously from a common display pattern displayed on a display device such as a spatial light modulator.

That is, the first image and second image may be formed during or as part of the same display event. A display event may comprise displaying a pattern on a display device and illuminate the display pattern to spatially modulate the light in accordance with the pattern. In these cases, the information facilitating formation of the first image and second image is contained—e.g., encoded—in the same light pattern. A technical advancement achieved by these embodiments is that an interlacing scheme is not required to form the two images.

The display pattern may be a diffractive pattern such as a hologram.

The diffractive pattern may be a Fourier hologram, a Fresnel hologram, a point cloud hologram or a combination thereof.

The first image may be a first virtual image. Additionally, or alternatively, the second image may be a second virtual image. In embodiments, virtual images are formed using an optical combiner or window of the host vehicle such as the windscreen. For example, the light forming the first and second image may be reflected by the windscreen towards the viewer.

The second image area may extend no further in angular space that then first image in at least one direction of the first dimension from all positions within the eye-box. Accordingly, the light ray bundle forming the first image and second image (at substantially the same time) is delimited in accordance with the first image area. It may therefore be said that the light rays forming the far-field image requires no additional volume space beyond that required by the near-field image. In this respect, it can be said that there is no cost (in space/volume terms) associated with providing a far-field image in addition to a near-field image.

The first dimension may be the vertical direction (from the perspective of a viewer such as a driver of the host vehicle). Alternative, the first dimension may be the horizontal direction (from the perspective of a viewer such as a driver of the host vehicle).

The center of the first image area in the second dimension may be substantially aligned with the center of the second image area in the second dimension. For example, the near-field image and far-field image may be aligned in the second/horizontal direction.

The first image area may be at least partially overlapping in the first dimension with the second image area when viewed from the eye-box/in angular space from the center of the eye-box. The second image area may extend no further in angular space than the first image area in at least one direction of the first dimension (when viewed) from all positions within the eye-box.

The first image area distance may be less than 5 meters such as less than 3 meters. The second image area distance may be less than 20 meters such as less than 15 meters.

The angular field of view of the head-up display in the second dimension may be in the range 5 to 25 degrees. The angular field of view of the head-up display in the first dimension may be 3 to 10 degrees.

The head-up display further comprises a user-tracking system such as an eye-tracking system. The head-up display may be arranged to determine the display pattern in real-time at least partially based on an eye-box position within the eye-box determined by the user-tracking system.

There is also disclosed herein a method of displaying a plurality of images using the described head-up display. The method may comprise changing at least one of the first and second image area distance based on a change to the eye-box position determined by the user-tracking system. In these embodiments, the image area distance associated with the far-field image may be maximized in real-time based on eye-tracking information. The image area distance associated with a central region of the eye-box may be greater than the image area distance associated with a peripheral region of the eye-box. For example, if the user-tracking system determines that the user has moved from a central position of the eye-box to a peripheral position of the eye-box, the system may be configured to reduce the image area distance at which the far-field image is presented/perceived in order to ensure that light rays of the far-field image do not clash with the vehicle. Likewise, for example, if the user-tracking system determines that the user has moved from a peripheral position of the eye-box to a central position of the eye-box, the system may be configured to increase the image area distance at which the far-field image is presented/perceived.

At least one of the first and second image area distance may be changed by changing the at least one lens function associated with the diffractive pattern.

The head-up display may comprise a picture generating unit e.g., image projector such as holographic projector. The head-up display or picture generating unit may comprise a display device such as a spatial light modulator e.g., liquid crystal on silicon spatial light modulator. The head-up display or picture generating unit may also comprise a light source e.g., laser diode arranged to illuminate the display device. The head-up display or picture generating unit may further comprise a waveguide arranged to expand an exit pupil of the picture generating unit. The waveguide may be disposed between the display device and eye-box/viewer. The picture or image may be formed by reconstructing a target image from/using a diffractive structure comprising a hologram. The diffractive structure, or display pattern, is displayed on the display device. The diffractive structure or hologram may be configured to angularly distribute the image content in accordance with position within the image. The hologram may be a Fourier hologram, Fresnel hologram, point cloud hologram or any combination thereof. The hologram may be determined or calculated in real-time from a target image. The head-up display may be configured for operation with an optical combiner such as the windscreen of a vehicle. The optical combiner forms at least one virtual image visible to the viewer from the eye-box. The head-up display may comprise an eye-tracking system providing information on viewing position within an eye-box that is required/used during determination/calculation of the hologram. The system may be characterised by the absence of bulk optics, such as a mirror, providing magnification. In some embodiments, the diffractive pattern compensates for any curvature of the optical combiner and/or provides any necessary magnification for the real-world application.

The term "hologram" is used to refer to the recording which contains amplitude information or phase information, or some combination thereof, regarding the object. The term "holographic reconstruction" is used to refer to the optical reconstruction of the object which is formed by illuminating the hologram. The system disclosed herein is described as a "holographic projector" because the holographic reconstruction may be a real image and spatially-separated from the hologram. The term "replay field" is used to refer to the 2D area within which the holographic reconstruction is formed and fully focused. If the hologram is displayed on a spatial light modulator comprising pixels, the replay field will be repeated in the form of a plurality diffracted orders wherein each diffracted order is a replica of the zeroth-order replay field. The zeroth-order replay field generally corresponds to the preferred or primary replay field because it is the brightest replay field. Unless explicitly stated otherwise, the term "replay field" should be taken as referring to the zeroth-order replay field. The term "replay plane" is used to refer to the plane in space containing all the replay fields. The terms "image", "replay image" and "image region" refer to areas of the replay field illuminated by light of the holographic reconstruction. In some embodiments, the "image" may comprise discrete spots which may be referred to as "image spots" or, for convenience only, "image pixels".

The terms "encoding", "writing" or "addressing" are used to describe the process of providing the plurality of pixels of the SLM with a respective plurality of control values which respectively determine the modulation level of each pixel. It may be said that the pixels of the SLM are configured to "display" a light modulation distribution in response to receiving the plurality of control values. Thus, the SLM may be said to "display" a hologram and the hologram may be considered an array of light modulation values or levels.

It has been found that a holographic reconstruction of acceptable quality can be formed from a "hologram" containing only phase information related to the original object (i.e., target image for reconstruction). Such a holographic recording may be referred to as a phase-only hologram. Embodiments relate to a phase-only hologram but the present disclosure is equally applicable to amplitude-only holography. The present disclosure is not limited to any particular method of hologram calculation. Some embodiments relate to point cloud holograms—that is, holograms built up using point cloud methods—by way of example only. However, the present disclosure is equally applicable to Fourier or Fresnel-type holograms and holograms calculated according to other techniques such as coherent ray tracing.

The present disclosure is also equally applicable to forming a holographic reconstruction using amplitude and phase information related to the original object (i.e., target image). In some embodiments, this is achieved by complex modulation using a so-called fully complex hologram which contains both amplitude and phase information related to the original object. Such a hologram may be referred to as a fully-complex hologram because the value (grey level) assigned to each pixel of the hologram has an amplitude and phase component. The value (grey level) assigned to each pixel may be represented as a complex number having both amplitude and phase components. In some embodiments, a fully-complex computer-generated hologram is calculated.

Reference may be made to the phase value, phase component, phase information or, simply, phase of pixels of the computer-generated hologram or the spatial light modulator as shorthand for "phase-delay". That is, any phase value described is, in fact, a number (e.g., in the range 0 to $2\pi$) which represents the amount of phase retardation provided by that pixel. For example, a pixel of the spatial light modulator described as having a phase value of $\pi/2$ will retard the phase of received light by $\pi/2$ radians. In some embodiments, each pixel of the spatial light modulator is operable in one of a plurality of possible modulation values (e.g., phase delay values). The term "grey level" may be used to refer to the plurality of available modulation levels. For example, the term "grey level" may be used for convenience to refer to the plurality of available phase levels in a phase-only modulator even though different phase levels do not provide different shades of grey. The term "grey level" may also be used for convenience to refer to the plurality of available complex modulation levels in a complex modulator.

The hologram therefore comprises an array of grey levels—that is, an array of light modulation values such as an array of phase-delay values or complex modulation values. The hologram is also considered a diffractive pattern because it is a pattern that causes diffraction when displayed on a spatial light modulator and illuminated with light having a wavelength comparable to, generally less than, the pixel pitch of the spatial light modulator. Reference is made herein to combining the hologram with other diffractive patterns such as diffractive patterns functioning as a lens or grating. For example, a diffractive pattern functioning as a grating may be combined with a hologram to translate the replay field on the replay plane or a diffractive pattern functioning as a lens may be combined with a hologram to focus the holographic reconstruction on a replay plane in the near field.

Although different embodiments and groups of embodiments may be disclosed separately in the detailed description which follows, any feature of any embodiment or group of embodiments may be combined with any other feature or combination of features of any embodiment or group of embodiments. That is, all possible combinations and permutations of features disclosed in the present disclosure are envisaged.

BRIEF DESCRIPTION OF THE DRAWINGS

Specific embodiments are described by way of example only with reference to the following figures:

FIG. 6a shows a viewing system with a relatively large propagation distance, which includes a waveguide, for forming a virtual image at infinity;

FIG. 6b shows a magnified view of the optical paths of FIG. 6a;

FIG. 7 shows the optical system in accordance with embodiments;

FIG. 8 is a flowchart showing the steps of a method in accordance with embodiments;

The same reference numbers will be used throughout the drawings to refer to the same or like parts.

DETAILED DESCRIPTION OF EMBODIMENTS

The present invention is not restricted to the embodiments described in the following but extends to the full scope of the appended claims. That is, the present invention may be embodied in different forms and should not be construed as limited to the described embodiments, which are set out for the purpose of illustration.

Terms of a singular form may include plural forms unless specified otherwise.

A structure described as being formed at an upper portion/lower portion of another structure or on/under the other structure should be construed as including a case where the structures contact each other and, moreover, a case where a third structure is disposed there between.

In describing a time relationship—for example, when the temporal order of events is described as "after", "subsequent", "next", "before" or suchlike—the present disclosure should be taken to include continuous and non-continuous events unless otherwise specified. For example, the description should be taken to include a case which is not continuous unless wording such as "just", "immediate" or "direct" is used.

Although the terms "first", "second", etc. may be used herein to describe various elements, these elements are not to be limited by these terms. These terms are only used to distinguish one element from another. For example, a first element could be termed a second element, and, similarly, a second element could be termed a first element, without departing from the scope of the appended claims.

Figure 1:
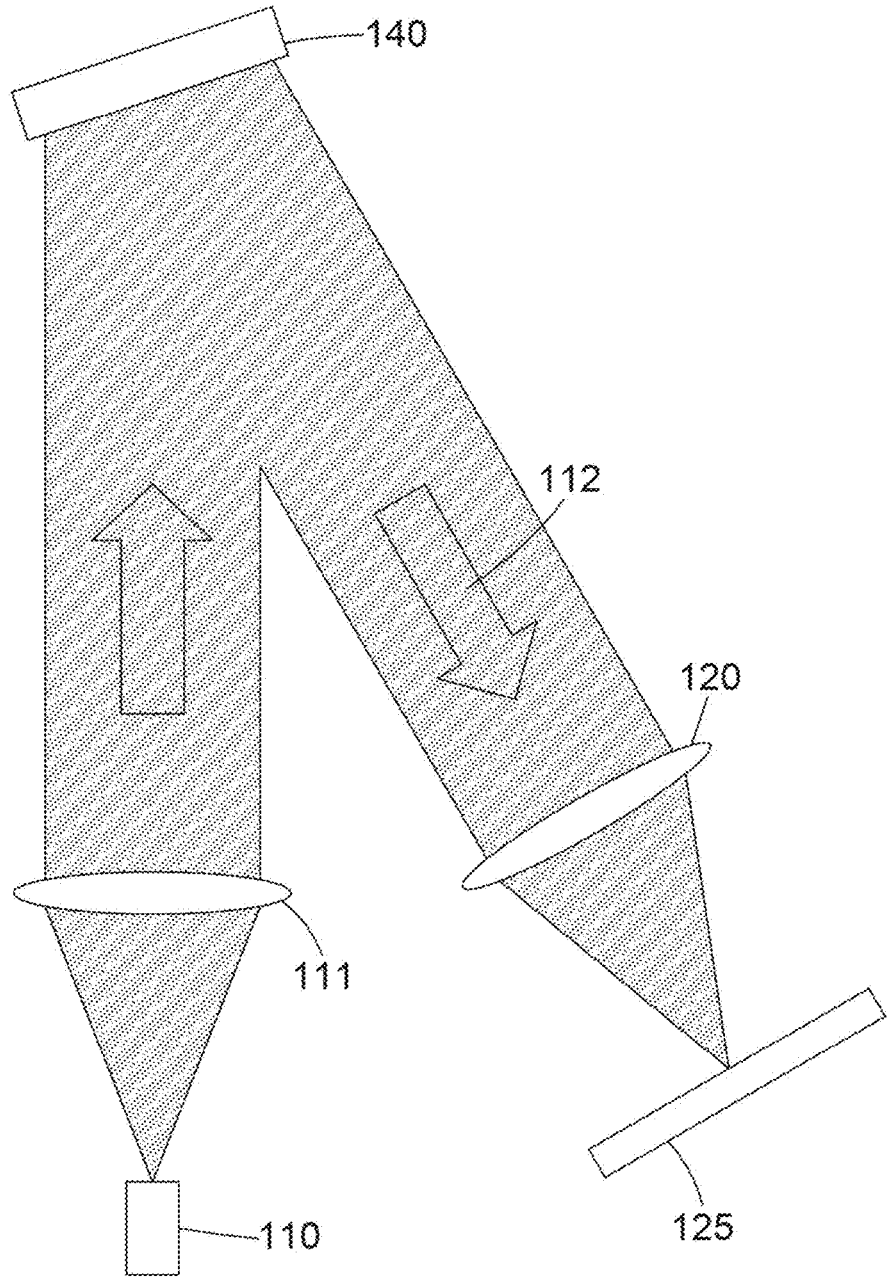
FIG. 1 is a schematic showing a reflective SLM producing a holographic reconstruction on a screen.

Features of different embodiments may be partially or overall coupled to or combined with each other, and may be variously inter-operated with each other. Some embodiments may be carried out independently from each other, or may be carried out together in co-dependent relationship.
Optical Configuration FIG. 1 shows an embodiment in which a computer-generated hologram is encoded on a single spatial light modulator. The computer-generated hologram is a Fourier transform of the object for reconstruction. It may therefore be said that the hologram is a Fourier domain or frequency domain or spectral domain representation of the object. In this embodiment, the spatial light modulator is a reflective liquid crystal on silicon, "LCOS", device. The hologram is encoded on the spatial light modulator and a holographic reconstruction is formed at a replay field, for example, a light receiving surface such as a screen or diffuser.

A light source 110, for example a laser or laser diode, is disposed to illuminate the SLM 140 via a collimating lens 111. The collimating lens causes a generally planar wavefront of light to be incident on the SLM. In FIG. 1, the direction of the wavefront is off-normal (e.g., two or three degrees away from being truly orthogonal to the plane of the transparent layer). However, in other embodiments, the generally planar wavefront is provided at normal incidence and a beam splitter arrangement is used to separate the input and output optical paths. In the embodiment shown in FIG. 1, the arrangement is such that light from the light source is reflected off a mirrored rear surface of the SLM and interacts with a light-modulating layer to form an exit wavefront 112. The exit wavefront 112 is applied to optics including a Fourier transform lens 120, having its focus at a screen 125. More specifically, the Fourier transform lens 120 receives a beam of modulated light from the SLM 140 and performs a frequency-space transformation to produce a holographic reconstruction at the screen 125.

Notably, in this type of holography, each pixel of the hologram contributes to the whole reconstruction. There is not a one-to-one correlation between specific points (or image pixels) on the replay field and specific light-modulating elements (or hologram pixels). In other words, modulated light exiting the light-modulating layer is distributed across the replay field.

In these embodiments, the position of the holographic reconstruction in space is determined by the dioptric (focusing) power of the Fourier transform lens. In the embodiment shown in FIG. 1, the Fourier transform lens is a physical lens. That is, the Fourier transform lens is an optical Fourier transform lens and the Fourier transform is performed optically. Any lens can act as a Fourier transform lens but the performance of the lens will limit the accuracy of the Fourier transform it performs. The skilled person understands how to use a lens to perform an optical Fourier transform.

Example Hologram Calculation

In some embodiments, the computer-generated hologram is a Fourier transform hologram, or simply a Fourier hologram or Fourier-based hologram, in which an image is reconstructed in the far field by utilising the Fourier transforming properties of a positive lens. The Fourier hologram is calculated by Fourier transforming the desired light field in the replay plane back to the lens plane. Computer-generated Fourier holograms may be calculated using Fourier transforms.

A Fourier transform hologram may be calculated using an algorithm such as the Gerchberg-Saxton algorithm. Furthermore, the Gerchberg-Saxton algorithm may be used to calculate a hologram in the Fourier domain (i.e., a Fourier transform hologram) from amplitude-only information in the spatial domain (such as a photograph). The phase information related to the object is effectively "retrieved" from the amplitude-only information in the spatial domain. In some embodiments, a computer-generated hologram is calculated from amplitude-only information using the Gerchberg-Saxton algorithm or a variation thereof.

The Gerchberg Saxton algorithm considers the situation when intensity cross-sections of a light beam, $I_A(x, y)$ and $I_B(x, y)$, in the planes A and B respectively, are known and $I_A(x, y)$ and $I_B(x, y)$ are related by a single Fourier transform. With the given intensity cross-sections, an approximation to the phase distribution in the planes A and B, $\Psi_A(x, y)$ and $\Psi_B(x, y)$ respectively, is found. The Gerchberg-Saxton algorithm finds solutions to this problem by following an iterative process. More specifically, the Gerchberg-Saxton algorithm iteratively applies spatial and spectral constraints while repeatedly transferring a data set (amplitude and phase), representative of $I_A(x, y)$ and $I_B(x, y)$, between the spatial domain and the Fourier (spectral or frequency)

domain. The corresponding computer-generated hologram in the spectral domain is obtained through at least one iteration of the algorithm. The algorithm is convergent and arranged to produce a hologram representing an input image. The hologram may be an amplitude-only hologram, a phase-only hologram or a fully complex hologram.

In some embodiments, a phase-only hologram is calculated using an algorithm based on the Gerchberg-Saxton algorithm such as described in British patent 2,498,170 or 2,501,112 which are hereby incorporated in their entirety by reference. However, embodiments disclosed herein describe calculating a phase-only hologram by way of example only. In these embodiments, the Gerchberg-Saxton algorithm retrieves the phase information $\Psi[u, v]$ of the Fourier transform of the data set which gives rise to a known amplitude information $T[x, y]$, wherein the amplitude information $T[x, y]$ is representative of a target image (e.g., a photograph). Since the magnitude and phase are intrinsically combined in the Fourier transform, the transformed magnitude and phase contain useful information about the accuracy of the calculated data set. Thus, the algorithm may be used iteratively with feedback on both the amplitude and the phase information. However, in these embodiments, only the phase information $\Psi[u, v]$ is used as the hologram to form a holographic representative of the target image at an image plane. The hologram is a data set (e.g., 2D array) of phase values.

In other embodiments, an algorithm based on the Gerchberg-Saxton algorithm is used to calculate a fully-complex hologram. A fully-complex hologram is a hologram having a magnitude component and a phase component. The hologram is a data set (e.g., 2D array) comprising an array of complex data values wherein each complex data value comprises a magnitude component and a phase component.

In some embodiments, the algorithm processes complex data and the Fourier transforms are complex Fourier transforms. Complex data may be considered as comprising (i) a real component and an imaginary component or (ii) a magnitude component and a phase component. In some embodiments, the two components of the complex data are processed differently at various stages of the algorithm.

Figure 2A:
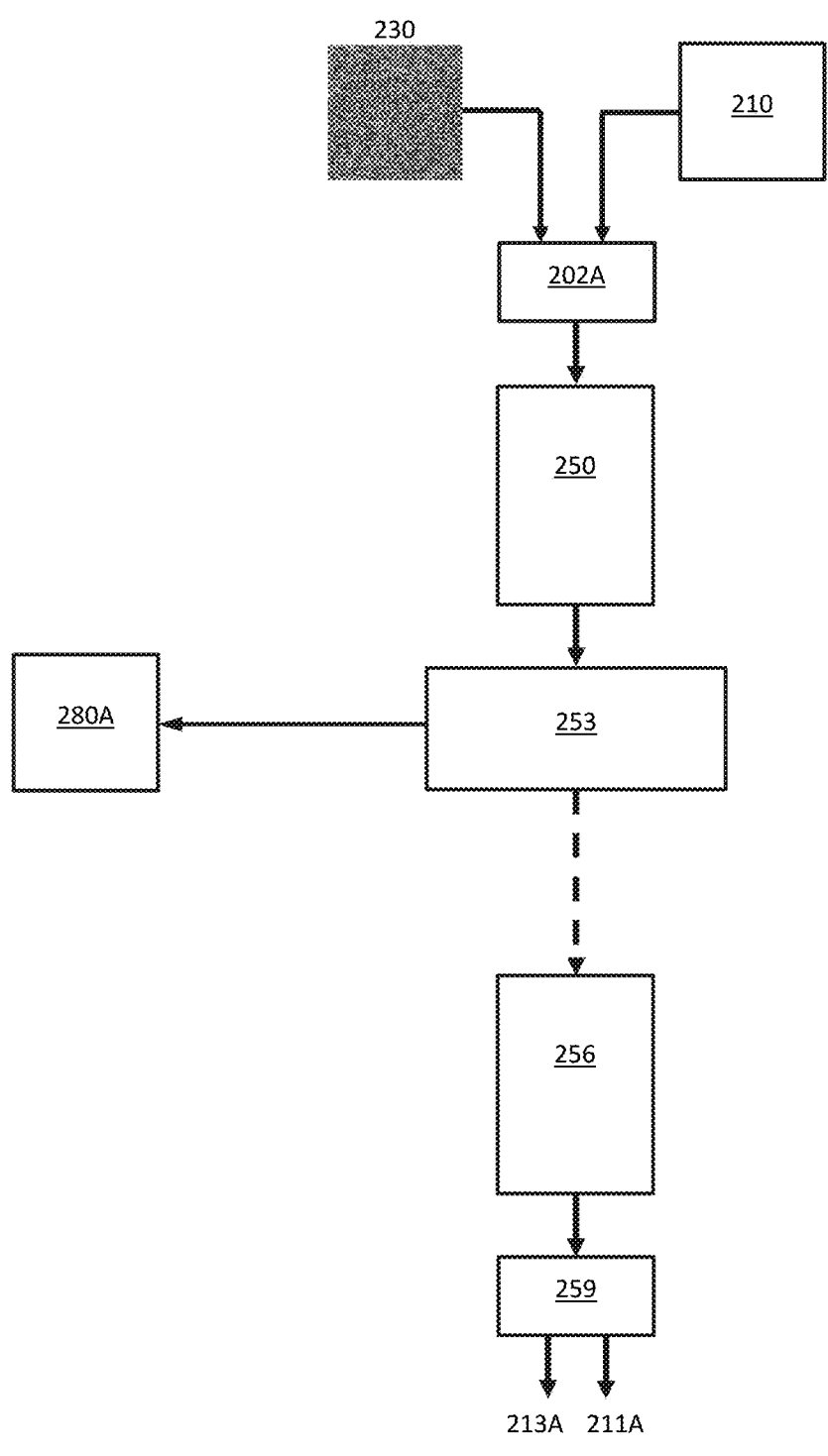
FIG. 2A illustrates a first iteration of an example Gerchberg-Saxton type algorithm.

FIG. 2A illustrates the first iteration of an algorithm in accordance with some embodiments for calculating a phase-only hologram. The input to the algorithm is an input image 210 comprising a 2D array of pixels or data values, wherein each pixel or data value is a magnitude, or amplitude, value. That is, each pixel or data value of the input image 210 does not have a phase component. The input image 210 may therefore be considered a magnitude-only or amplitude-only or intensity-only distribution. An example of such an input image 210 is a photograph or one frame of video comprising a temporal sequence of frames. The first iteration of the algorithm starts with a data forming step 202A comprising assigning a random phase value to each pixel of the input image, using a random phase distribution (or random phase seed) 230, to form a starting complex data set wherein each data element of the set comprising magnitude and phase. It may be said that the starting complex data set is representative of the input image in the spatial domain.

First processing block 250 receives the starting complex data set and performs a complex Fourier transform to form a Fourier transformed complex data set. Second processing block 253 receives the Fourier transformed complex data set and outputs a hologram 280A. In some embodiments, the hologram 280A is a phase-only hologram. In these embodiments, second processing block 253 quantises each phase value and sets each amplitude value to unity in order to form hologram 280A. Each phase value is quantised in accordance with the phase-levels which may be represented on the pixels of the spatial light modulator which will be used to "display" the phase-only hologram. For example, if each pixel of the spatial light modulator provides 256 different phase levels, each phase value of the hologram is quantised into one phase level of the 256 possible phase levels. Hologram 280A is a phase-only Fourier hologram which is representative of an input image. In other embodiments, the hologram 280A is a fully complex hologram comprising an array of complex data values (each including an amplitude component and a phase component) derived from the received Fourier transformed complex data set. In some embodiments, second processing block 253 constrains each complex data value to one of a plurality of allowable complex modulation levels to form hologram 280A. The step of constraining may include setting each complex data value to the nearest allowable complex modulation level in the complex plane. It may be said that hologram 280A is representative of the input image in the spectral or Fourier or frequency domain. In some embodiments, the algorithm stops at this point.

However, in other embodiments, the algorithm continues as represented by the dotted arrow in FIG. 2A. In other words, the steps which follow the dotted arrow in FIG. 2A are optional (i.e., not essential to all embodiments).

Third processing block 256 receives the modified complex data set from the second processing block 253 and performs an inverse Fourier transform to form an inverse Fourier transformed complex data set. It may be said that the inverse Fourier transformed complex data set is representative of the input image in the spatial domain.

Fourth processing block 259 receives the inverse Fourier transformed complex data set and extracts the distribution of magnitude values 211A and the distribution of phase values 213A. Optionally, the fourth processing block 259 assesses the distribution of magnitude values 211A. Specifically, the fourth processing block 259 may compare the distribution of magnitude values 211A of the inverse Fourier transformed complex data set with the input image 510 which is itself, of course, a distribution of magnitude values. If the difference between the distribution of magnitude values 211A and the input image 210 is sufficiently small, the fourth processing block 259 may determine that the hologram 280A is acceptable. That is, if the difference between the distribution of magnitude values 211A and the input image 210 is sufficiently small, the fourth processing block 259 may determine that the hologram 280A is a sufficiently-accurate representative of the input image 210. In some embodiments, the distribution of phase values 213A of the inverse Fourier transformed complex data set is ignored for the purpose of the comparison. It will be appreciated that any number of different methods for comparing the distribution of magnitude values 211A and the input image 210 may be employed and the present disclosure is not limited to any particular method. In some embodiments, a mean square difference is calculated and if the mean square difference is less than a threshold value, the hologram 280A is deemed acceptable. If the fourth processing block 259 determines that the hologram 280A is not acceptable, a further iteration of the algorithm may be performed. However, this comparison step is not essential and in other embodiments, the number of iterations of the algorithm performed is predetermined or preset or user-defined.

Figure 2B:
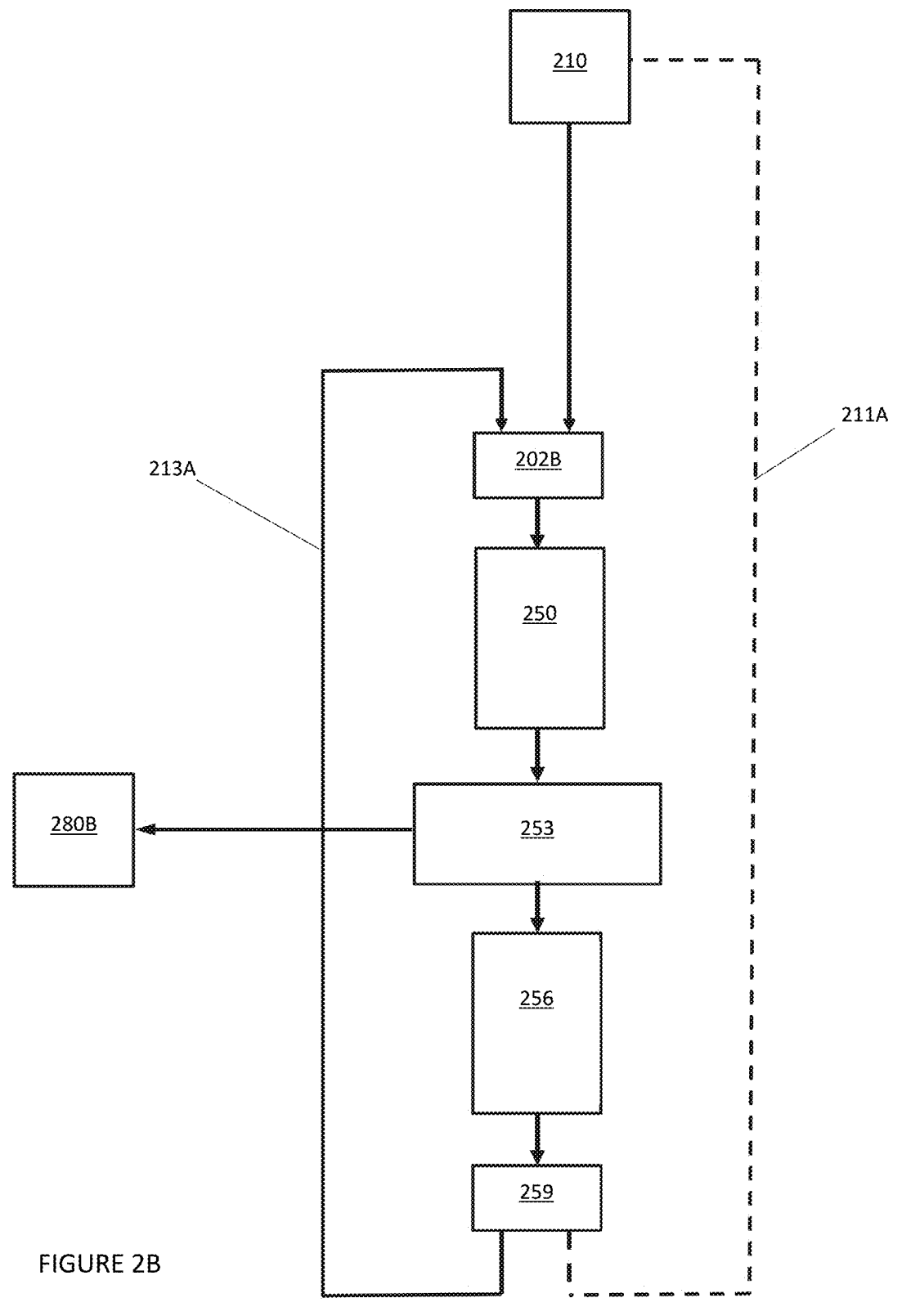
FIG. 2B illustrates the second and subsequent iterations of the example Gerchberg-Saxton type algorithm.

FIG. 2B represents a second iteration of the algorithm and any further iterations of the algorithm. The distribution of phase values 213A of the preceding iteration is fed-back through the processing blocks of the algorithm. The distribution of magnitude values 211A is rejected in favour of the distribution of magnitude values of the input image 210. In the first iteration, the data forming step 202A formed the first complex data set by combining distribution of magnitude values of the input image 210 with a random phase distribution 230. However, in the second and subsequent iterations, the data forming step 202B comprises forming a complex data set by combining (i) the distribution of phase values 213A from the previous iteration of the algorithm with (ii) the distribution of magnitude values of the input image 210.

The complex data set formed by the data forming step 202B of FIG. 2B is then processed in the same way described with reference to FIG. 2A to form second iteration hologram 280B. The explanation of the process is not therefore repeated here. The algorithm may stop when the second iteration hologram 280B has been calculated. However, any number of further iterations of the algorithm may be performed. It will be understood that the third processing block 256 is only required if the fourth processing block 259 is required or a further iteration is required. The output hologram 280B generally gets better with each iteration. However, in practice, a point is usually reached at which no measurable improvement is observed or the positive benefit of performing a further iteration is out-weighted by the negative effect of additional processing time. Hence, the algorithm is described as iterative and convergent.

Figure 2C:
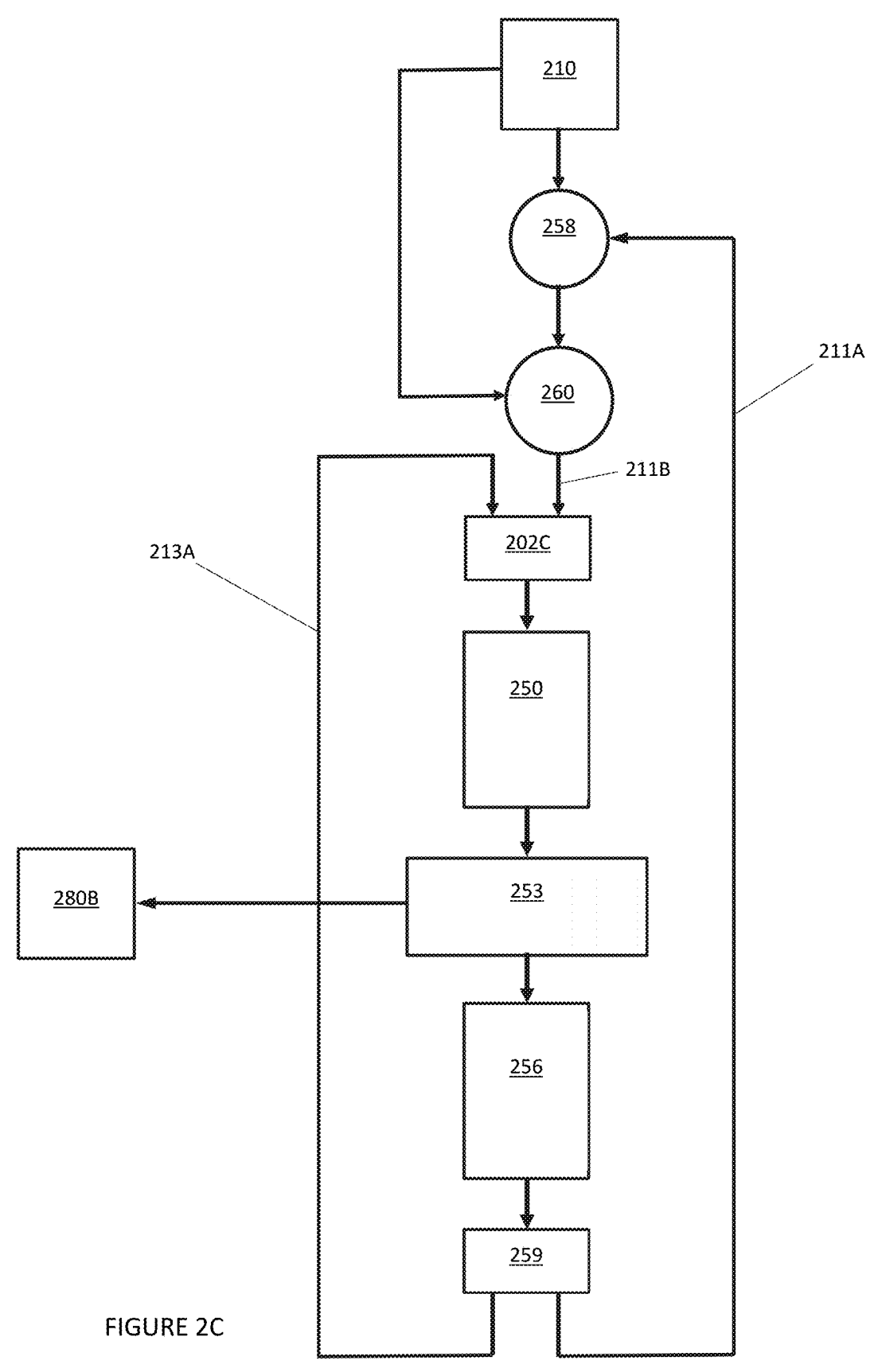
FIG. 2C illustrates alternative second and subsequent iterations of the example Gerchberg-Saxton type algorithm.

FIG. 2C represents an alternative embodiment of the second and subsequent iterations. The distribution of phase values 213A of the preceding iteration is fed-back through the processing blocks of the algorithm. The distribution of magnitude values 211A is rejected in favour of an alternative distribution of magnitude values. In this alternative embodiment, the alternative distribution of magnitude values is derived from the distribution of magnitude values 211 of the previous iteration. Specifically, processing block 258 subtracts the distribution of magnitude values of the input image 210 from the distribution of magnitude values 211 of the previous iteration, scales that difference by a gain factor $\alpha$ and subtracts the scaled difference from the input image 210. This is expressed mathematically by the following equations, wherein the subscript text and numbers indicate the iteration number:

$$R_{n+1}[x,y]=F'\{\exp(i\Psi_n[u,v])\}$$

$$\Psi_n[u,v]=\angle F\{\eta\cdot\exp(i\angle R_n[x,y])\}$$

$$\eta=T[x,y]-\alpha(|R_n[x,y]|-T[x,y])$$

where:
  F' is the inverse Fourier transform;
  F is the forward Fourier transform;
  R[x, y] is the complex data set output by the third processing block 256;
  T[x, y] is the input or target image;
  $\angle$ is the phase component;
  $\Psi$ is the phase-only hologram 280B;
  $\eta$ is the new distribution of magnitude values 211B; and
  $\alpha$ is the gain factor.

The gain factor $\alpha$ may be fixed or variable. In some embodiments, the gain factor $\alpha$ is determined based on the size and rate of the incoming target image data. In some embodiments, the gain factor $\alpha$ is dependent on the iteration number. In some embodiments, the gain factor $\alpha$ is solely function of the iteration number.

The embodiment of FIG. 2C is the same as that of FIG. 2A and FIG. 2B in all other respects. It may be said that the phase-only hologram $\Psi(u, v)$ comprises a phase distribution in the frequency or Fourier domain.

In some embodiments, the Fourier transform is performed using the spatial light modulator. Specifically, the hologram data is combined with second data providing optical power. That is, the data written to the spatial light modulation comprises hologram data representing the object and lens data representative of a lens. When displayed on a spatial light modulator and illuminated with light, the lens data emulates a physical lens—that is, it brings light to a focus in the same way as the corresponding physical optic. The lens data therefore provides optical, or focusing, power. In these embodiments, the physical Fourier transform lens 120 of FIG. 1 may be omitted. It is known how to calculate data representative of a lens. The data representative of a lens may be referred to as a software lens. For example, a phase-only lens may be formed by calculating the phase delay caused by each point of the lens owing to its refractive index and spatially-variant optical path length. For example, the optical path length at the center of a convex lens is greater than the optical path length at the edges of the lens. An amplitude-only lens may be formed by a Fresnel zone plate. It is also known in the art of computer-generated holography how to combine data representative of a lens with a hologram so that a Fourier transform of the hologram can be performed without the need for a physical Fourier lens. In some embodiments, lensing data is combined with the hologram by simple addition such as simple vector addition. In some embodiments, a physical lens is used in conjunction with a software lens to perform the Fourier transform. Alternatively, in other embodiments, the Fourier transform lens is omitted altogether such that the holographic reconstruction takes place in the far-field. In further embodiments, the hologram may be combined in the same way with grating data—that is, data arranged to perform the function of a grating such as image steering. Again, it is known in the field how to calculate such data. For example, a phase-only grating may be formed by modelling the phase delay caused by each point on the surface of a blazed grating. An amplitude-only grating may be simply superimposed with an amplitude-only hologram to provide angular steering of the holographic reconstruction. The second data providing lensing and/or steering may be referred to as a light processing function or light processing pattern to distinguish from the hologram data which may be referred to as an image forming function or image forming pattern.

In some embodiments, the Fourier transform is performed jointly by a physical Fourier transform lens and a software lens. That is, some optical power which contributes to the Fourier transform is provided by a software lens and the rest of the optical power which contributes to the Fourier transform is provided by a physical optic or optics.

In some embodiments, there is provided a real-time engine arranged to receive image data and calculate holograms in real-time using the algorithm. In some embodiments, the image data is a video comprising a sequence of image frames. In other embodiments, the holograms are pre-calculated, stored in computer memory and recalled as needed for display on a SLM. That is, in some embodiments, there is provided a repository of predetermined holograms.

Embodiments relate to Fourier holography and Gerchberg-Saxton type algorithms by way of example only. The present disclosure is equally applicable to Fresnel holography and Fresnel holograms which may be calculated by a similar method. The present disclosure is also applicable to holograms calculated by other techniques such as those based on point cloud methods.

Light Modulation

A spatial light modulator may be used to display the diffractive pattern including the computer-generated hologram. If the hologram is a phase-only hologram, a spatial light modulator which modulates phase is required. If the hologram is a fully-complex hologram, a spatial light modulator which modulates phase and amplitude may be used or a first spatial light modulator which modulates phase and a second spatial light modulator which modulates amplitude may be used.

In some embodiments, the light-modulating elements (i.e., the pixels) of the spatial light modulator are cells containing liquid crystal. That is, in some embodiments, the spatial light modulator is a liquid crystal device in which the optically-active component is the liquid crystal. Each liquid crystal cell is configured to selectively-provide a plurality of light modulation levels. That is, each liquid crystal cell is configured at any one time to operate at one light modulation level selected from a plurality of possible light modulation levels. Each liquid crystal cell is dynamically-reconfigurable to a different light modulation level from the plurality of light modulation levels. In some embodiments, the spatial light modulator is a reflective liquid crystal on silicon (LCOS) spatial light modulator but the present disclosure is not restricted to this type of spatial light modulator.

A LCOS device provides a dense array of light modulating elements, or pixels, within a small aperture (e.g., a few centimeters in width). The pixels are typically approximately 10 microns or less which results in a diffraction angle of a few degrees meaning that the optical system can be compact. It is easier to adequately illuminate the small aperture of a LCOS SLM than it is the larger aperture of other liquid crystal devices. An LCOS device is typically reflective which means that the circuitry which drives the pixels of a LCOS SLM can be buried under the reflective surface. The results in a higher aperture ratio. In other words, the pixels are closely packed meaning there is very little dead space between the pixels. This is advantageous because it reduces the optical noise in the replay field. A LCOS SLM uses a silicon backplane which has the advantage that the pixels are optically flat. This is particularly important for a phase modulating device.

Figure 3:
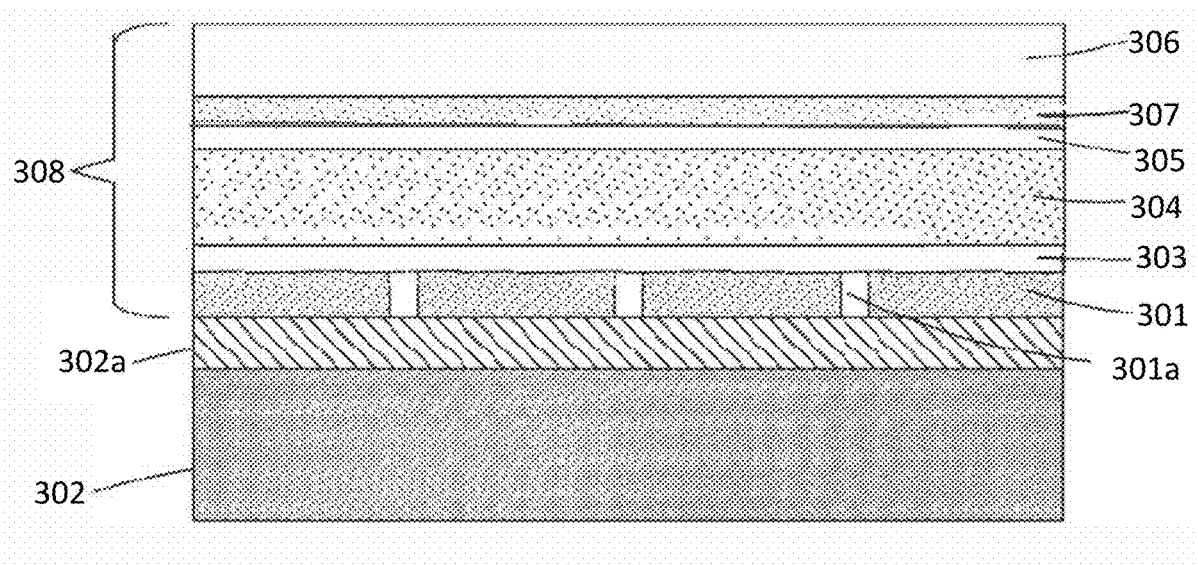
FIG. 3 is a schematic of a reflective LCOS SLM.

A suitable LCOS SLM is described below, by way of example only, with reference to FIG. 3. An LCOS device is formed using a single crystal silicon substrate 302. It has a 2D array of square planar aluminium electrodes 301, spaced apart by a gap 301a, arranged on the upper surface of the substrate. Each of the electrodes 301 can be addressed via circuitry 302a buried in the substrate 302. Each of the electrodes forms a respective planar mirror. An alignment layer 303 is disposed on the array of electrodes, and a liquid crystal layer 304 is disposed on the alignment layer 303. A second alignment layer 305 is disposed on the planar transparent layer 306, e.g., of glass. A single transparent electrode 307 e.g., of ITO is disposed between the transparent layer 306 and the second alignment layer 305.

Each of the square electrodes 301 defines, together with the overlying region of the transparent electrode 307 and the intervening liquid crystal material, a controllable phase-modulating element 308, often referred to as a pixel. The effective pixel area, or fill factor, is the percentage of the total pixel which is optically active, taking into account the space between pixels 301a. By control of the voltage applied to each electrode 301 with respect to the transparent electrode 307, the properties of the liquid crystal material of the respective phase modulating element may be varied, thereby to provide a variable delay to light incident thereon. The effect is to provide phase-only modulation to the wavefront, i.e., no amplitude effect occurs.

The described LCOS SLM outputs spatially modulated light in reflection. Reflective LCOS SLMs have the advantage that the signal lines, gate lines and transistors are below the mirrored surface, which results in high fill factors (typically greater than 90%) and high resolutions. Another advantage of using a reflective LCOS spatial light modulator is that the liquid crystal layer can be half the thickness than would be necessary if a transmissive device were used. This greatly improves the switching speed of the liquid crystal (a key advantage for the projection of moving video images). However, the teachings of the present disclosure may equally be implemented using a transmissive LCOS SLM.

The present disclosure relates to head-up display of a near-field image and far-field image, optionally, wherein there is at least partial overlap between the near-field image and far-field image. For the avoidance of doubt, the teachings of the present disclosure are applicable to any method of image formation and embodiments using holography are described by way of example only. Some embodiments describe a method of calculating a hologram of the images which is particularly suitable when the display device for the hologram is relatively small and the viewing distance is relatively long. These embodiments are provided merely as examples of how to form the plurality of images in accordance with this disclosure. The present disclosure is not limited to holography or image projection using a small display device and long viewing distance, however, these examples are particularly synergistic with the image area optimization defined herein.

Image Projection Using a Small Display Device and a Long Viewing Distance

In some embodiments, the separation between the display device and viewer is much greater than the size of the display device. The viewing distance (i.e., distance between the viewer and display device) may be at least an order of magnitude greater than the size of the display device. The viewing distance may be at least two orders of magnitude greater than the size of the display device. For example, the pixel area of the display device may be 10 mm×10 mm and the viewing distance may be 1 m. The image projected by the system is formed on a display plane that is spatially separated from the display device.

In accordance with some embodiments, the image is formed by holographic projection. A hologram is displayed on the display device. The hologram is illuminated by a light source (not shown) and an image is perceived on a display plane that is spatially separated from the hologram. The image may be real or virtual. For the purpose of the explanation that follows, it is helpful to consider a virtual image formed upstream of the display device. That is, appearing behind the display device. However, it is not essential that the image is a virtual image and the present disclosure is equally applicable to a real image formed between the display device and viewing system.

The display device comprises pixels that display the hologram. The pixel structure of the display device is diffractive. The size of the holographic image is therefore governed by the rules of diffraction. A consequence of the diffractive nature of the display device is explained below with reference to FIG. 4.

Figure 4:
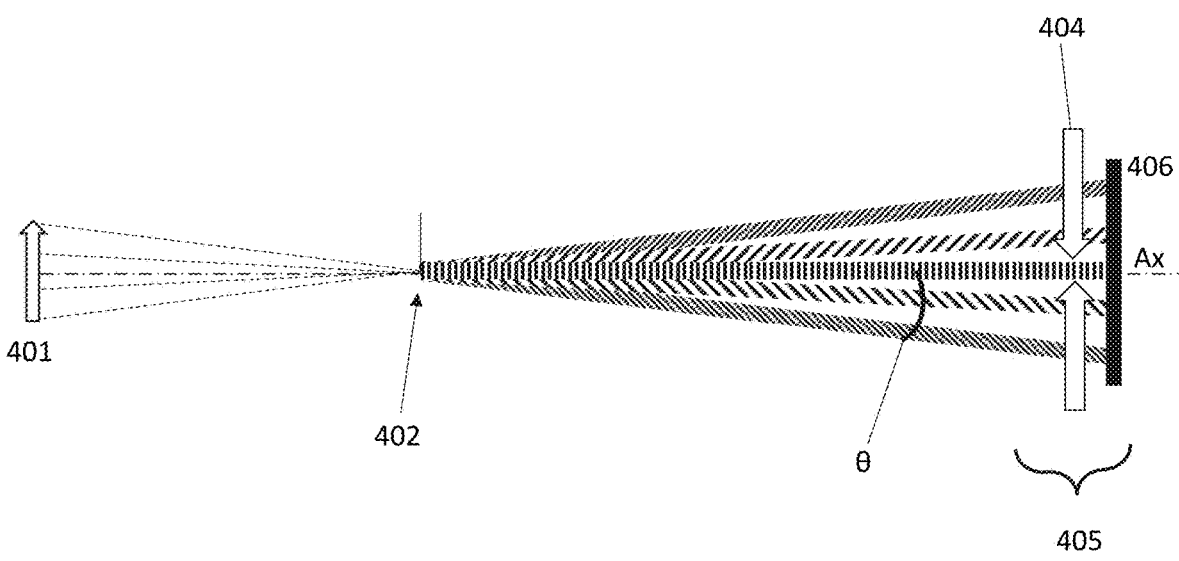
FIG. 4 shows angular content of a virtual image effectively propagating from a display device towards an aperture.

FIG. 4 shows a pixelated display device 402 arranged to display a hologram forming a virtual image 401 upstream of the display device 402. The diffraction angle, θ, of the display device determines the size of the virtual image 401. The virtual image 401, display device 402 and viewing system 405 are arranged on an optical axis, Ax.

The viewing system 405 has an entrance aperture 404 and viewing plane 406. The viewing system 406 may be a human eye. The entrance aperture 404 may therefore be the pupil of the eye and the viewing plane 406 may be the retina of the eye.

The light travelling between the display device 402 and viewing system 405 is modulated with a hologram of the image (not the image itself). However, FIG. 4 illustrates how the hologram divides the virtual image content by angle. Each illustrated light ray bundle relates to a different part of the virtual image 401. More specifically, the light in each light ray bundle is encoded by the hologram with information about one part of the virtual image. FIG. 4 shows five example ray bundles each characterized by a respective angle to the optical axis, Ax, and each representing a respective part of the virtual image. In this example, one of the light bundles passes through the pupil 404 and the other four light bundles are blocked by the pupil 404. Again, the five different ray bundles correspond to five different parts of the virtual image 401. The full image content of the virtual image is effectively divided by angle. The light bundle travelling along the optical axis, Ax, carries the center part of the image information—that is, the information relating to the center of the image. The other light bundles carry the other parts of the image information. The two light bundles shown at the extremes of the light cone carry the edge parts of the image information. A consequence of this division of the image information by angle is that not all image content can pass through the entrance aperture 404 of the viewing system at a given viewing position. In other words, not all image content is received by the eye. In the example of FIG. 4, only one of the five light bundles illustrated passes through the pupil 404 at any viewing position. The reader will understand that five light bundles are shown by way of example only and the process described is not limited to division of the image information of the virtual image into only five light bundles.

In this example, the center part of the image information is received by the eye. The edge part of the image information is blocked by the pupil of the eye. The reader will understand that if the viewer moves up or down, a different light bundle may be received by the eye and, for example, the center part of the image information may be blocked. The viewer therefore only sees a portion of the full image. The rest of the image information is blocked by the entrance pupil. The view of the viewer is heavily restricted because they are effectively looking at the image through the small aperture of the display device itself.

In summary, light propagates over the range of diffraction angle from the display device. At a 1 m viewing distance, only a small range of angles from the display device can propagate through the eye's pupil to form image at the retina for a given eye position. The only parts of the virtual image that are visible are the ones falling within the small angular range shown in FIG. 4 that passes through the entrance aperture. Accordingly, the field of view is very small, and the specific angular range depends heavily on the eye position.

The problem of the small field of view and sensitivity to eye position explained with reference to FIG. 4 is a consequence of the large viewing distance and small aperture of the display device. The importance of viewing distance is explained further with reference to FIGS. 5 to 7.

Figure 5A:
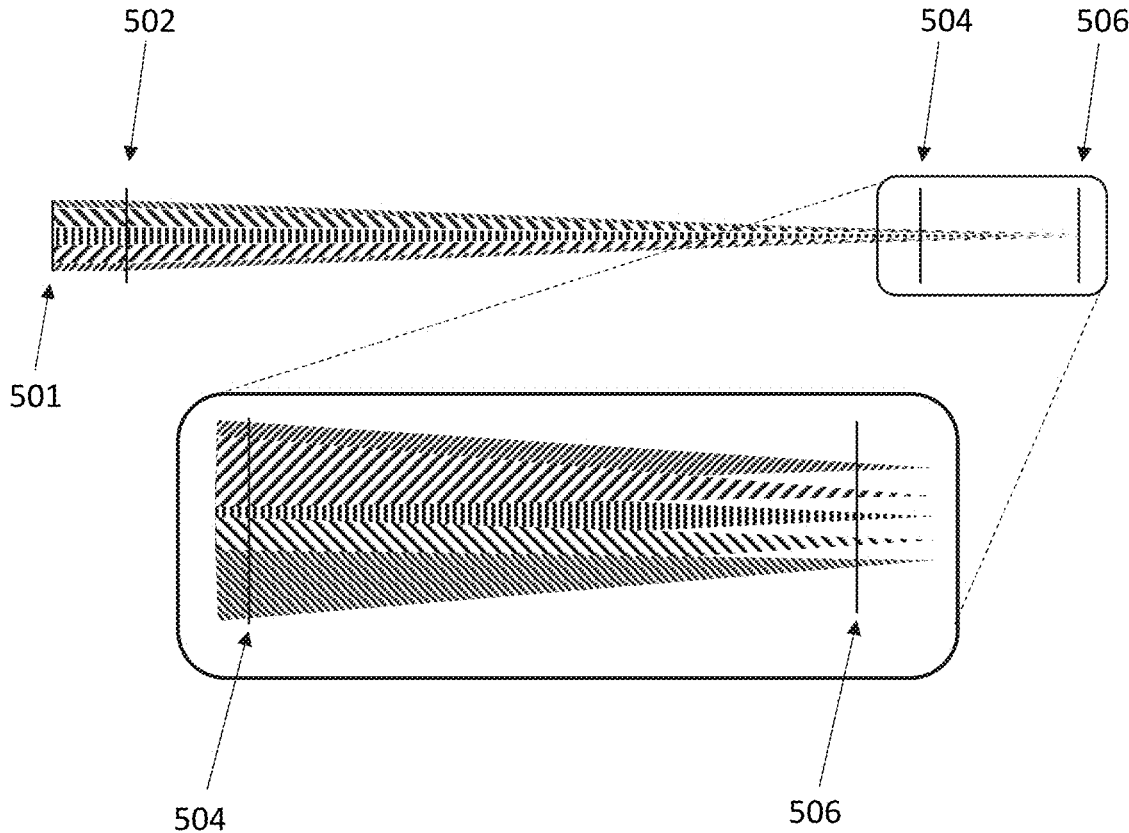
FIG. 5a shows a viewing system with a relatively small propagation distance.

FIG. 5A shows a display device 502 arranged to display a hologram and propagate light modulated in accordance with the hologram to a viewing system comprising an entrance aperture 504 and viewing plane 506. The virtual image 501 is at infinity and so the rays traced between the virtual image and display device are collimated. The lower part of FIG. 5A shows a magnified view of the viewing system. This figure is schematic and therefore physiological detail of the eye is not shown. In practice, there is, of course, a light source (not shown in FIG. 5A) arranged to illuminate the display device 502.

FIG. 5A only shows those rays of light that can propagate through the aperture 504; any other rays, which cannot pass through the aperture 504, are omitted. However, it will be understood that those other rays would also propagate from the display device 502, in practice. In FIG. 5A, the distance between the display device and viewing plane is small enough that the full diffraction angle from the display device can form the image on the retina. All light propagation paths shown from the virtual image pass through the entrance aperture. Accordingly, all points on the virtual image map onto the retina and all image content is delivered to the viewing plane. The field of view of the perceived image is therefore a maximum. At the optimum position, the field of view is equal to the diffraction angle of the display device. Interestingly, different image points on the retina are formed from light propagating from different regions on the display device 502—e.g., the image point closest to the top of FIG. 5A is formed from light propagating from the lower portion of the display device only. Light propagating from other regions of the display device does not contribute to this image point.

Figure 5B:
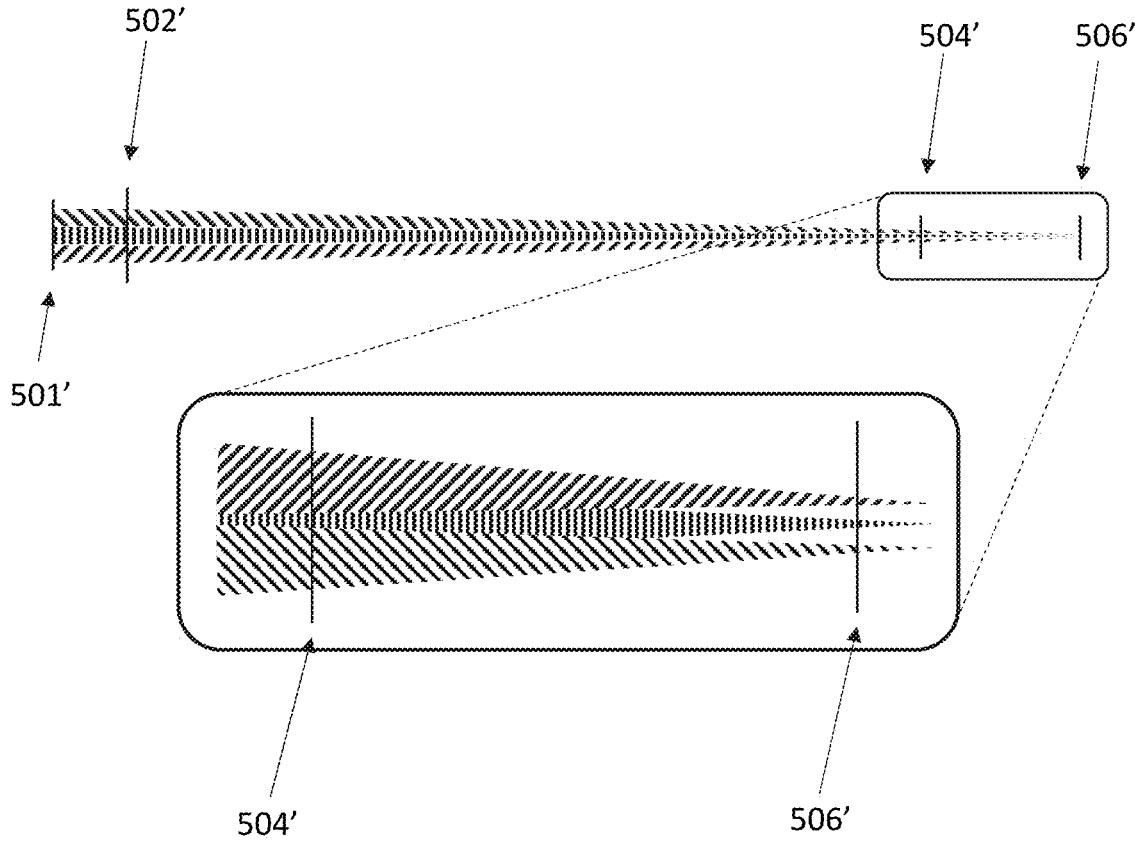
FIG. 5b shows a viewing system with a relatively large propagation distance.

FIG. 5B shows the situation that arises as the viewing distance is increased.

In more detail, FIG. 5B shows a display device 502' arranged to display a hologram and propagate light modulated in accordance with the hologram to a viewing system comprising an entrance aperture 504' and viewing plane 506'. The virtual image 501' is at infinity and so the rays traced between the virtual image and display device are collimated. The lower part of FIG. 5B shows a magnified view of the viewing system. This figure is schematic and therefore physiological detail of the eye is not shown. In practice, there is, of course, a light source (not shown in FIG. 5B) arranged to illuminate the display device 502'.

FIG. 5B only shows those rays of light that can propagate through the aperture 504'. At the larger viewing distance of FIG. 5B, some of the ray bundles are blocked by the entrance aperture 504'. Specifically, ray bundles associated with edge parts of the virtual image are blocked by the entrance pupil 504'. Accordingly, the entire virtual image is not visible and the part of the virtual image that is visible is heavily dependent on eye position. Thus, large distances between the display device and viewing system are problematic owing to the small size of the display device.

FIG. 6A shows an improved system comprising a display device 602, propagating light that has been encoded with a hologram displayed on the display device 602, towards a viewing system that comprises an entrance aperture 604 and a viewing plane 606. In practice, there is, of course, a light source (not shown) arranged to illuminate the display device 602. The improved system further comprises a waveguide 608 positioned between the display device 602 and the entrance aperture 604. The lower part of FIG. 6A shows a magnified view of the entrance pupil 604 and the viewing plane 604. This figure is schematic and therefore physiological detail of the eye is not shown.

The viewing distance of FIG. 6 is the same as that of FIG. 5B. However, the ray bundles that were blocked in FIG. 5B are effectively recovered by the waveguide 608 such that the full image information is received by the viewing system—despite the longer viewing distance.

The presence of the waveguide 608 enables all angular content from the display device 602 to be received by the eye, even at this relatively large projection distance. This is because the waveguide 608 acts as a pupil expander, in a manner that is well known and so is described only briefly herein.

In brief, the waveguide 608 comprises a substantially elongate formation. In this example, it comprises an optical slab of refractive material, but other types of waveguide are also well known and may be used. The waveguide 608 is located so as to intersect the light cone that is projected from the display device 602, for example at an oblique angle. The size, location, and position of the waveguide 608 are configured to ensure that light from each of the five ray bundles, within the light cone, enters the waveguide 608. Light from the light cone enters the waveguide 608 via its first planar surface 610 (located nearest the display device 602) and is guided at least partially along the length of the waveguide 608, before being emitted via its second planar surface 612, substantially opposite the first surface 610 (located nearest the eye). As will be well understood, the second planar surface 612 is partially reflective, partially transmissive. In other words, when each ray of light travels, within the waveguide 608, from the first planar surface 610 to the second planar surface 612 of the waveguide 608, some of the light will be transmitted out of the waveguide 608 and some will be reflected by the second planar surface 612, back towards the first planar surface 610. The first planar surface 610 is reflective, such that all light that hits it, from within the waveguide 608, will be reflected back towards the second planar surface 612.

Therefore, some of the light may simply be refracted between the two planar surfaces 610, 612 of the waveguide 608 before being transmitted, whilst other light may be reflected, and thus may undergo one or more reflections, (or 'bounces') between the planar surfaces 610, 612 of the waveguide 608, before being transmitted. A net effect of the waveguide 608 is therefore that the transmission of the light is effectively expanded across multiple locations on the second planar surface 612 of the waveguide 608. All angular content output by the display device 602 may thus be present, at a greater number of positions on the display plane (and at a greater number of positions on the aperture plane) than would have been the case, in the absence of the waveguide 608. This means that light from each ray bundle may enter the entrance aperture 604 and contribute to an image formed by the viewing plane 606, despite the relatively large projection distance. In other words, all angular content from the display device 602 can be received by the eye. Therefore, the full diffraction angle of the display device 602 is utilised and the viewing window is maximised for the user. In turn, this means that all the light rays contribute to the perceived virtual image 601.

Figure 6B:
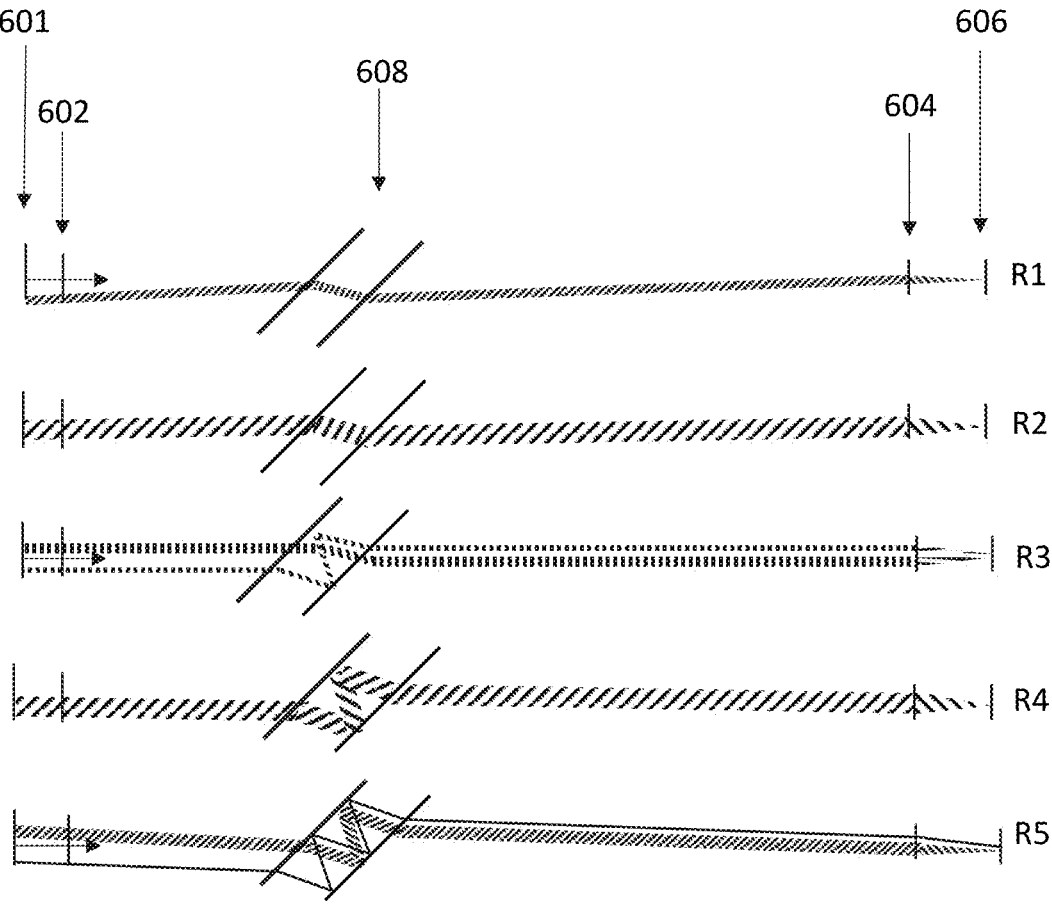

FIG. 6B shows the individual optical paths for each of the five ray bundles that contribute to five respective image points within the virtual image 601 that is formed in FIG. 6A—labelled from top to bottom as R1 to R5, respectively. As can be seen therein, the light of each of R1 and R2 is simply refracted and then transmitted by the waveguide 608. The light of R4, on the other hand, encounters a single bounce before being transmitted. The light of R3 comprises some light from a corresponding first part of the display device 602 that is simply refracted by the waveguide 608 before being transmitted, and some light from a second, different corresponding part of the display device 602 that encounters a single bounce before being transmitted. Similarly, the light of R5 comprises some light from a corresponding first part of the display device 602 that encounters a single bounce before being transmitted and some light from a second, different corresponding part of the display device 602 that encounters two bounces before being transmitted. For each of R3 and R5, two different parts of the LCOS propagate light corresponding to that part of the virtual image.

In some applications, it is preferable for the virtual image distance—i.e., for the distance from the viewer to the virtual image—to be finite, as opposed to the virtual image being formed at infinity. In certain applications, there will be a preferred virtual image distance, at which it is desirable or necessary for the virtual image content to appear. For example, this can be the case in a head-up display, for example in an automotive setting, for example if virtual image content is to be superimposed onto real content that is being viewed by the viewer through a vehicle windscreen. For example, a desired virtual image distance may comprise the virtual image content being formed a few meters, for example 3 meters or 5 meters, in front of the viewer's vehicle or windscreen.

Hologram Calculation to Form First and Second Images on Different Planes

In accordance with the present disclosure, image content appears at different distances from the viewing system and/or plural distances, optionally, at the same time—e.g., using one display pattern. The method also allows image content to appear downstream of the display device and upstream of the display device, optionally, at the same time—e.g., using one display pattern. In some embodiments—described by way of example only of how to form first and second image content on different planes—an iterative algorithm is used to calculate a hologram that reconstructs the image content when illuminated.

FIG. 7 shows a spatial light modulator 701 operable to display a hologram of an image. In this embodiment, the spatial light modulator 701 is a liquid crystal on silicon device arranged to module the phase of received light. The spatial light modulator 701 is illuminated by at least partially coherent light from a light source not shown. The light source may be a laser diode. The spatial light modulator 701 outputs light that is spatially modulated in accordance with the display hologram. FIG. 7 shows one light ray 702 of the spatially modulated light. The spatially modulated light is received by a pupil expander 703. The pupil expander 703 is inclined relative to the plane of the display device 701. The pupil expander 703 therefore receives light at non-normal incidence. The incident angle (the angle the optical axis makes with the pupil expander) may be less than 25 degrees such as 10 to 20 degrees. The pupil expander comprises an input surface 703a that receives the spatially modulated light and an output surface 703b. The input surface 703a and output surface 703b are substantially parallel and elongate in a direction of pupil expansion. The input surface 703a comprises at least a portion that is substantially fully reflection (e.g., R=1). The output surface 703b comprises at least a portion that is highly reflective but partially transmissive (e.g., R=0.9 and T=0.1). The reflective surfaces are arranged such that spatially modulated light bounces back and forth therebetween, and light is emitted at a plurality of points along the output surface 703b, as described above with reference to waveguide 608 of FIG. 6. In this embodiment, the pupil expander is substantially elongate. The pupil expander provides pupil expansion in one-direction—namely, the elongate direction—but the present disclosure may be expanded to include the presence of a second pupil expander arranged to expand the pupil in an orthogonal direction.

FIG. 7 shows how light ray 702 has been effectively replicated twice to form three propagation paths 705 each associated with a different distance, $Z_0$, $Z_1$ and $Z_2$. The shortest propagation path corresponds to $Z_0$ and, in this example, light that has passed through the waveguide without any internal reflections. The middle-distance propagation path of the three shown corresponds to $Z_1$ and two internal reflections in the pupil expander (one by each surface). The longest propagation path shown corresponds to $Z_2$ and four internal reflections in the pupil expander (two by each surface). The planes $x_0$, $x_1$ and $x_2$ show the spatial extent of the light field associated with each of the three propagation paths, $Z_0$, $Z_1$ and $Z_2$, respectively. More specifically, FIG. 7 shows how the three planes $x_0$, $x_1$ and $x_2$ are offset from each other in the x-direction FIG. 7 further shows a viewing system 713 comprising an entrance pupil 707, a lens 709 and a light sensor 711. In embodiments, the viewing system 713 is a human eye and the light sensor 711 is the retina of the eye. FIG. 7 shows how only some of the light field associated with each propagation path passes through the entrance 707. FIG. 7 shows the light ray associated with center of the middle-distance propagation path passing through the center of the entrance pupil 707. But, for example, the light ray associated with the center of the light field of shortest propagation path is blocked by a top portion of the aperture 707. However, other light rays associated with the light field of the shortest propagation path can pass through the aperture 707. The light ray associated with the center of the light field of the longest propagation path is blocked by a lower portion of the aperture 707. However, other light rays associated with the light field of the longest propagation path can pass through the aperture 707 too.

Light passing through aperture 707 is focused by lens 709 onto the light sensor 711. The plane of the light sensor 711 is substantially parallel to the plane of the display device 701, and is therefore inclined relative to the elongate dimension of the pupil expander 703 too.

FIG. 7 shows three possible light propagation paths by way of example only. This example is not limited by the number of propagation paths. That is, as the skilled person will appreciate from the following description, the method may be extended to factor-in any number of light propagation paths. Likewise, it is not essential that the pupil expander is inclined relative to the display plane and sensor plane.

FIG. 8 is a flowchart showing the steps of the method. The method resembles a Gerchberg-Saxton type algorithm which uses mathematical transforms back and forth between the image plane and hologram to converge on a phase hologram corresponding to the image. The amplitude component of the light field after each propagation to the image plane or hologram plane is modified or constrained but the phase component is preserved.

A zeroth stage of the method comprises steps 802 and 804. The zeroth stage comprises forming a zeroth complex light field. Step 802 provides a random phase seed forming the phase component of the zeroth complex light field. Step 804 provides the amplitude component of the zeroth complex light field. The amplitude component may be unity or an amplitude distribution representative of the light of a light source that will be used to reconstruction the image from the hologram In step 806, the zeroth complex light field is Fresnel propagated from the spatial light modulator 701 (i.e., from the hologram plane) to the entrance pupil 707 of the viewing system 713 (more specifically, to the plane containing the entrance pupil 707 of the viewing system 713). Again, this embodiment refers to Fresnel propagation as just one example of a number of different mathematical transforms that may be used without departing from the spirit or scope of this disclosure. Step 806 is performed for each number of bounces or internal reflections provided by the pupil expander 703 to form a complex light field in respect of each light propagation path. Step 806 includes taking account of the lateral position of the complex light field in the x-direction at the plane of the entrance pupil 707, and phase shifts on each reflection within the pupil expander 703. The different complex light fields may be combined, for example, by addition. The first stage further comprises step 808 of cropping the combined complex light field in accordance with the size and shae of the entrance pupil 707 to form the first complex light field at the entrance pupil 707.

A second stage of the method comprises steps 810 and 812. In step 810, a second complex light field is determined by propagating the first complex light field from the entrance pupil through lens 709 and to the plane of the light sensor 711. Step 812 comprises modifying the amplitude component of the complex light field arriving at the light sensor 711. More specifically, step 812 comprises replacing the amplitude component of the complex light field with the amplitude component of the target image or an amplitude component based on that of the target image such as a weighted version of the amplitude component of the target image. The position of the lens 709 used in the propagation determines the image distance—that is, wherein space the image content will appear. In some embodiments, the image is a virtual image and this distance may be referred to as a virtual image distance, "VID".

Advantageously, the method disclosed herein allows image content to be formed at a plurality of different image distances—e.g., multiple VIDs— using the same hologram. This may be achieved by repeating the second stage for each image distance by considering different positions of lens 709 in the z-direction. The complex light fields determined in accordance with this approach for each different image distance may be combined by addition, for example.

A third stage of the method comprises step 814 in which the second complex light field is propagated back to the entrance pupil 707 via the lens 709. This may be referred to as a reverse propagation merely to reflect that the light is travelling in the opposite z-direction. In some embodiments, the reverse propagation is a mathematical inverse of the corresponding "forward" propagation. The third stage also comprises cropping the propagated light field in accordance with the size and shape of the entrance pupil 707 to form the third complex light field.

A fourth stage comprises steps 816 and 818. In step 816, the light is propagated back to the plane of the spatial light modulator 702 via the plurality of light propagations paths of the pupil expander, in the matter described above in relation to the first stage—but in the opposite light direction, of course (i.e., a "reverse" propagation). Step 818 comprises cropping the propagated light field in accordance with the size and position of the active/pixel area of the display device. The number of complex values of each complex light field may be equal or less than the number of pixels of the display device.

Step 820 comprises extracting the hologram from the fourth complex light field. The hologram may comprise the phase values of the fourth complex light field in which case the hologram may be referred to as a kinoform. As explained earlier in this disclosure, the method may equally start at the image plane (i.e., the third stage). At least one iteration of each stage is required in accordance with this disclosure.

However, the method disclosed herein with reference to FIGS. 4 to 8 is provided by way of example only and the present disclosure is not limited to this method because other ways of forming—e.g., partially overlapping—first and second images on different planes in a head-up display are equally suitable.

In another embodiment, the first and second image are formed using a point cloud hologram. As will be well understood, usually for calculation of a point cloud hologram of an image (such as a virtual image), the image is broken down into (i.e., represented by) a plurality of individual points—referred to herein as 'virtual points', since we describe the formation of virtual images. A spherical wave (or 'wavelet') is then propagated computationally—i.e., using a model or other theoretical tool—from each virtual point, at its intended or desired location, within the virtual image, to the plane of the display device—such as the plane of the display device, in the examples described hereabove. The way in which such wavelets would interfere with one another is considered and the resulting amplitude and/or phase of the wavelet that would be received at each pixel of the display device is calculated. The display device can then be tuned, in a manner that is well known and so will not be described herein, to exhibit the amplitude and/or phase modulation that is required at each pixel location, in order to mimic the calculated wavelets, and thus to create a hologram of the image or images. In a yet further embodiment, the first and second image are formed using a Fresnel hologram.

Figure 9A:
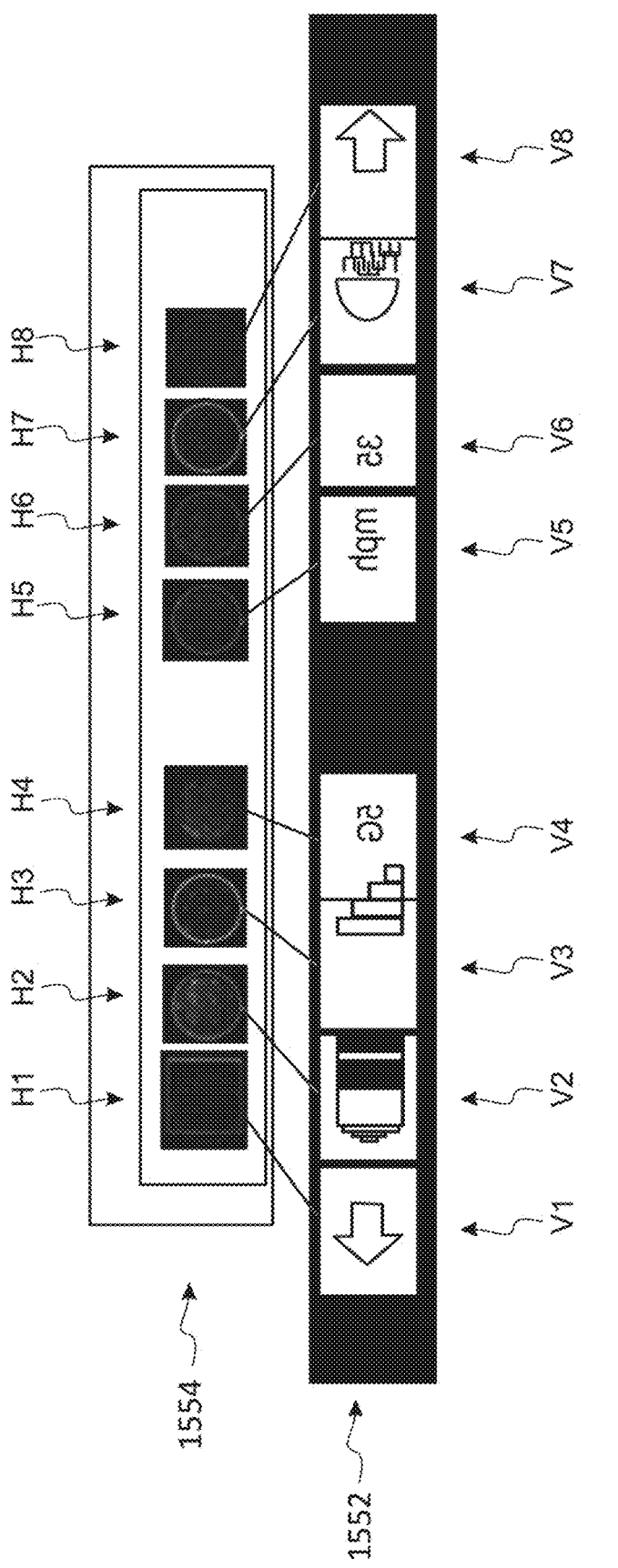
FIG. 9A shows an image for projection comprising eight image areas/components.
Figure 9B:
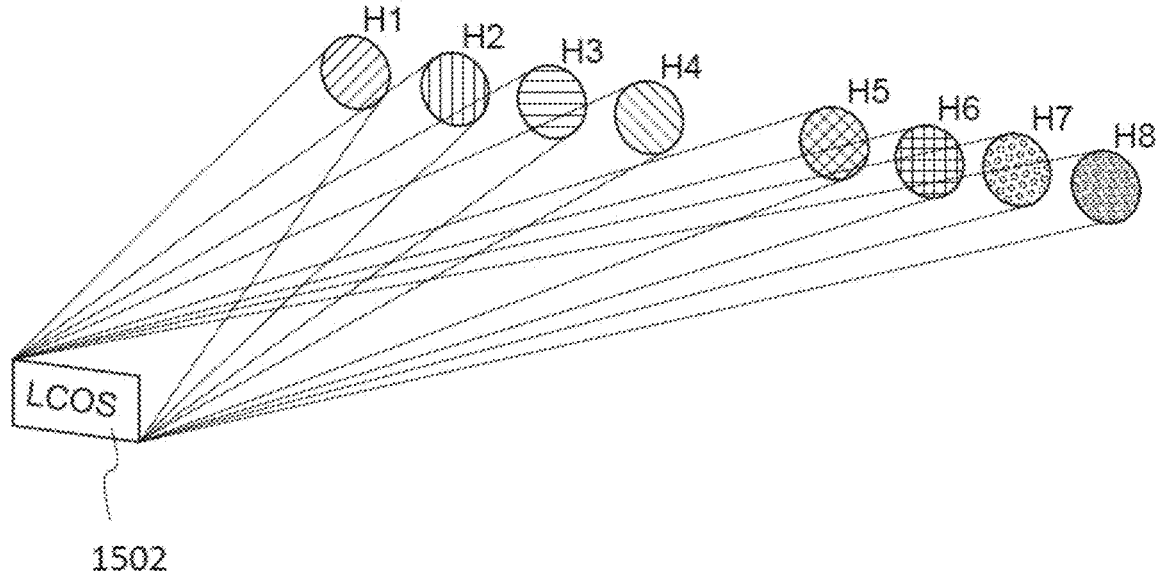
FIG. 9B shows an example of light channeled by a hologram.
Figure 10:
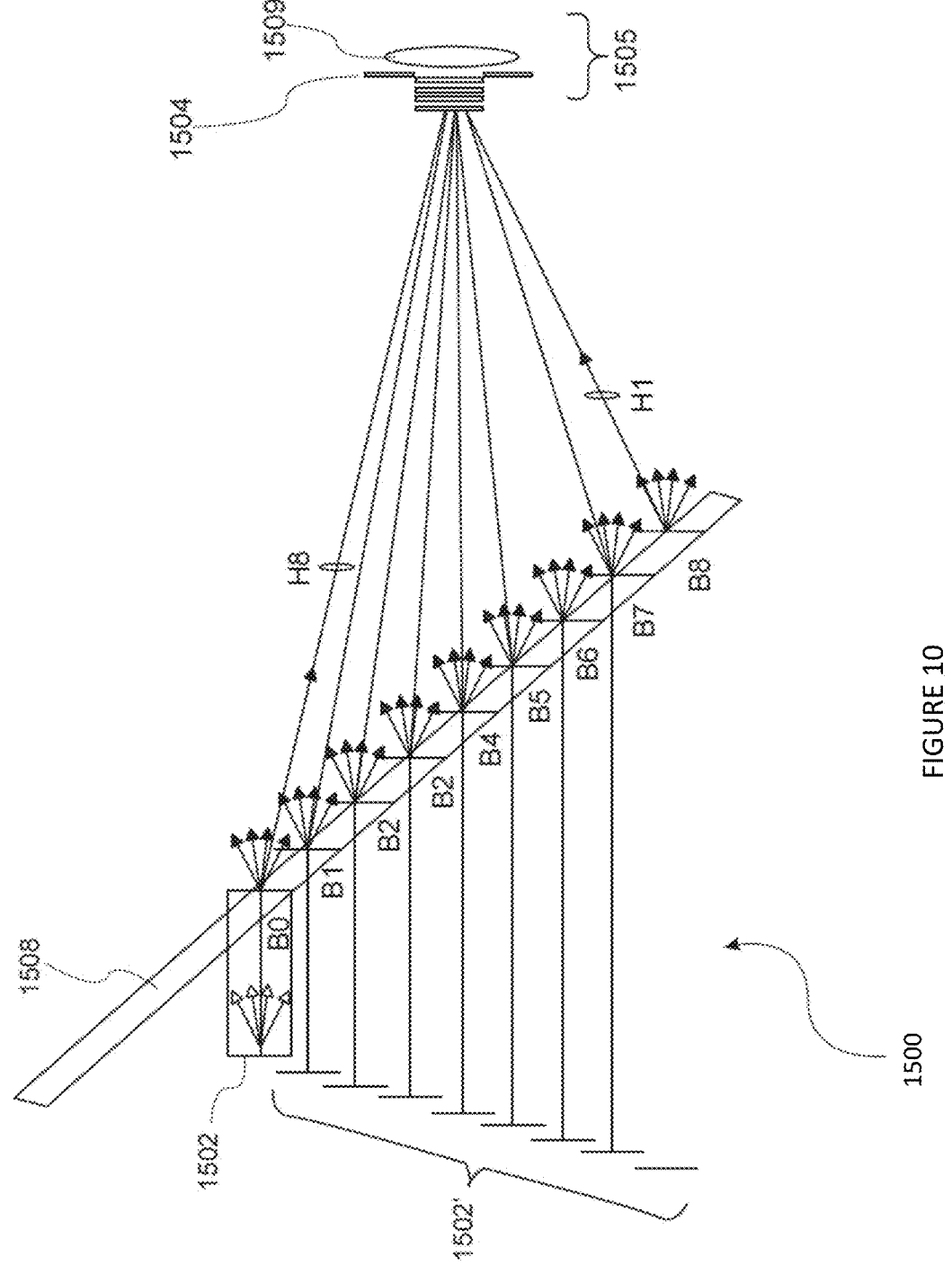
FIG. 10 shows an improved head-up display in accordance with some embodiments in which the field of view of the far-field image area is cropped in accordance with the near-field image area on one side in order to reduce the size of the light ray bundle forming near-field and far-field image content.

FIGS. 9A, 9B, and 10 describe the hologram formed by the method of FIG. 8.
Light Channeling FIG. 9A shows an image 1552 for projection comprising eight image areas/components, V1 to V8. FIG. 9A shows eight image components by way of example only and the image 1552 may be divided into any number of components. FIG. 9A also shows the encoded light pattern 1554 (i.e., hologram) that can reconstruct the image 1552—e.g., when transformed by the lens of a suitable viewing system. The encoded light pattern 1554 comprises first to eighth subholograms or components, H1 to H8, corresponding to the first to eighth image components/areas, V1 to V8. FIG. 9A further shows how this hologram calculated effectively decomposes the image content by angle. The hologram may therefore be characterised by the channeling of light that it performs. This is illustrated in FIG. 9B. Specifically, this hologram directs light into a plurality of discrete areas. The discrete areas are discs in the example shown but other shapes are envisaged. The size and shape of the optimum disc may, after propagation through the waveguide, be related to the size and shape of the entrance pupil of the viewing system. This channeling of light only occurs due to the specific method of determining the hologram disclosed herein.

FIG. 10 shows an improved viewing system 1500, in accordance with the recognitions illustrated in FIGS. 9A and 9B.

The viewing system 1500 comprises a display device, which in this arrangement comprises an LCOS 1502. The LCOS 1502 is arranged to display a modulation pattern (or 'diffractive pattern') comprising the hologram and to project light that has been holographically encoded towards an eye 1505 that comprises a pupil that acts as an aperture 1504, a lens 1509, and a retina (not shown) that acts as a viewing plane. There is a light source (not shown) arranged to illuminate the LCOS 1502. The lens 1509 of the eye 1505 performs a hologram to image transformation.

The viewing system 1500 further comprises a waveguide 1508 positioned between the LCOS 1502 and the eye 1505. The projection distance in FIG. 10 may be relatively large. However, as described in relation to previous Figures, the presence of the waveguide 1508 enables all angular content from the LCOS 1502 to be received by the eye 1505, even at this relatively large projection distance. This is because the waveguide 1508 acts as a pupil expander, in a manner that has been described hereabove.

Additionally, in this arrangement, when the LCOS 1502 has been encoded in accordance with the methods described herein, the waveguide 1508 can be oriented at an angle with respect to the LCOS 1502 in order to establish a unique relationship, between the light from the LCOS 1502 and the virtual image that the viewer will perceive. The size, location, and position of the waveguide 1508 are configured to ensure that light from each part of the virtual image enters the waveguide 1508 and is guided along its elongate axis, bouncing between the substantially planar surfaces of the waveguide 1508. Each time the light reaches the second planar surface (nearest the eye 1505), some light is transmitted and some light is reflected.

FIG. 10 shows a total of nine "bounce" points, B0 to B8, along the length of the waveguide 1502. The reader will notice that the center of the image 1552 kept blank. FIG. 15C shows zeroth to ninth light "bounce" or reflection points, B0 to B8, within the waveguide. Although light relating to all points of the image (V1-V8) is transmitted out of the waveguide at each "bounce" from the second planar surface of the waveguide 1508, only the light from one of angular part of the image (e.g., light of one of V1 to V8) has a trajectory that enables it to reach the eye 1505, from each respective "bounce" point, B0 to B8. Moreover, light from a different angular part of the image, V1 to V8, reaches the eye 1505 from each respective "bounce" point. FIG. 10 shows light from all the different angular content being emitted at each "bounce" point, (depicted by a plurality of short arrows at each transmission point), but then only shows the optical path, to the eye 1505, of the respective angular content that will actually reach the eye 1505— and therefore will contribute to a respective portion of the virtual image that the viewer will perceive—from that respective part of the waveguide. For example, for the zeroth bounce, B0, the light that is transmitted by the waveguide 1508 is simply refracted and does not undergo any reflections therein. Light of the eighth sub-hologram, H8, reaches the eye from the zeroth bounce, B0. For the next bounce B1, the light that is transmitted by the waveguide 1502 undergoes one bounce therein, before transmission. Light from the seventh hologram, H7, reaches the eye from the next bounce, B1 This continues in sequence until the light that is transmitted by the waveguide 1508 at the final bounce, B8, has undergone eight bounces, before being transmitted and reaching the eye 1505, and comprises light encoded in accordance with the first hologram, H1.

In the example shown in FIGS. 10, light of only one image area reaches the eye from each bounce point. A spatial correlation between areas of the virtual image and their associated bounce point on the waveguide is therefore established—when the hologram is determined as described herein. In some other examples, there may be relatively small overlaps such that one region of the image comes from two adjacent transmission points, and thus is comprised within two adjacent discs of light that propagate from the waveguide, towards the viewing plane.

Thus, a diffractive pattern (or, light modulation pattern) comprising a hologram is generated that, when displayed on an LCOS or other suitable display device, can enable the light to be emitted therefrom effectively in a plurality of 'discs', or ray bundles of light, each of which corresponds to (more specifically, encodes) a different respective part of the corresponding virtual image.

Again, although virtual images, which require the eye to transform received modulated light in order to form a perceived image, have generally been discussed herein, the improved methods and arrangements described herein can be applied to real images.

Field of View Optimization for Two Image Planes

Specific methods of forming a first and second image in a head-up display are described by way of example. The inventors have studied in depth the optical geometry that arises in a head-up display for a vehicle when near-field and far-field image content is presented to the viewer. In particular, the present disclosure relates to a finite sized eye-box. Some embodiments relate to the situation where there is at least partial overlap between the near image and far image. The terms "near" and "far" are merely used to distinguish the two spatially-separated image planes (e.g., replay planes) and are not limiting. The terms merely reflect the relative distance of the image plane from the viewing plane. The inventors have identified optimized conditions which provide a surprisingly significant reduction to the physical volume of the system. In some embodiments described, the optimized conditions identified by the inventors and disclosed herein are the difference between being able to package the head-up display assembly in a real-world vehicle and not.

Figure 11A:
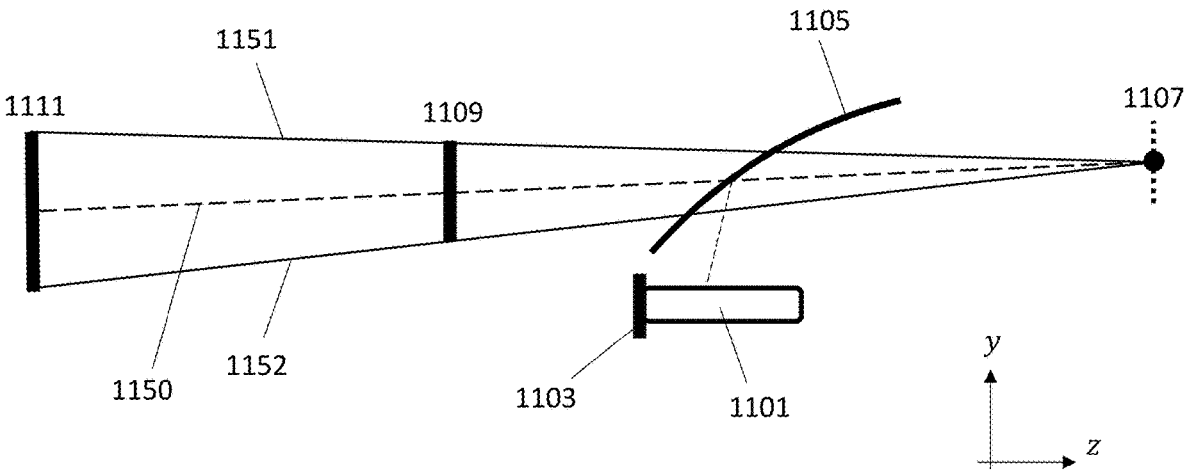
FIGS. 11A, 11B and 11C show how a far-field image may determine the size of a HUD light ray bundle when a finite size eye-box is provided.

FIG. 11A shows the yz plane of a system comprising a HUD assembly 1101 housed in a vehicle having a windscreen 1105. The x direction is the horizontal direction and the y direction is the vertical direction. FIG. 11A further shows the eye-box 1107 of the head-up display and part of the vehicle assembly 1103 which may be, for the example, part of the plenum of the vehicle. The eye-box is contained on an xy plane. The eye-box is spatially separated from the image planes in the z direction. A "viewing axis" of the head-up display may be parallel to the z direction or there may be a small angle between the viewing axis and z direction—e.g., a so-called "look-down angle". The viewing axis extends from the center of the eye-box and, in some examples, the center of at least one of the image areas. For example, the viewing axis may be a straight line connecting the center of the eye-box and center of a near-field virtual image area. The HUD assembly 1101 must be appropriately size and positioned within e.g., the dashboard to avoid physical conflict with the structure of the vehicle including, for example, the plenum. The viewing axis 1150 may be extended/extrapolated from the eye-box 1107 to the HUD assembly via a reflection off the windscreen 1105. Because the HUD images are reflected off the windscreen 1105 to the viewer/eye-box 1107, the images are virtual—that is, to a viewer position in the eye-box 1107, they appear on the other side of the windscreen 1105, i.e., outside the vehicle. A near-field virtual image area 1109 and a far-field virtual image area 1111 are generally positioned on or near the viewing axis but that is not essential. The near-field virtual image area and far-field virtual image area may be substantially perpendicular to the viewing axis. Near-field image content, such as fuel or speed information, may be displayed in the near-field virtual image area 1109. Far-field image content, such as navigation or warning information, may be displayed in the far-field virtual image area 1111. The near-field and far-field image content may vary in real time. The head-up display may be an augmented reality head-up display.

FIG. 11A further shows the field of view of a viewer from the center of the eye-box 1107 by way of a first line 1151 and second line 1152 which respectively extend from the center of the eye-box to opposite extremes of both virtual image area planes 1109, 1111 in the yz plane. More specifically, first line 1151 is a straight line joining the center of the eye-box 1107, the top of near-field virtual image area 1109 and the top of far-field virtual image area 1111. The second line 1152 is a straight line joining the center of the eye-box 1107, the bottom of near-field virtual image area 1109 and the bottom of far-field virtual image area 1111. In angular terms, the field of view in the vertical direction of the near-field virtual image area plane 1109 is substantially equal to the field of view in the vertical direction of the far-field virtual image area plane 1111 from the center of the eye-box.

Figure 11B:
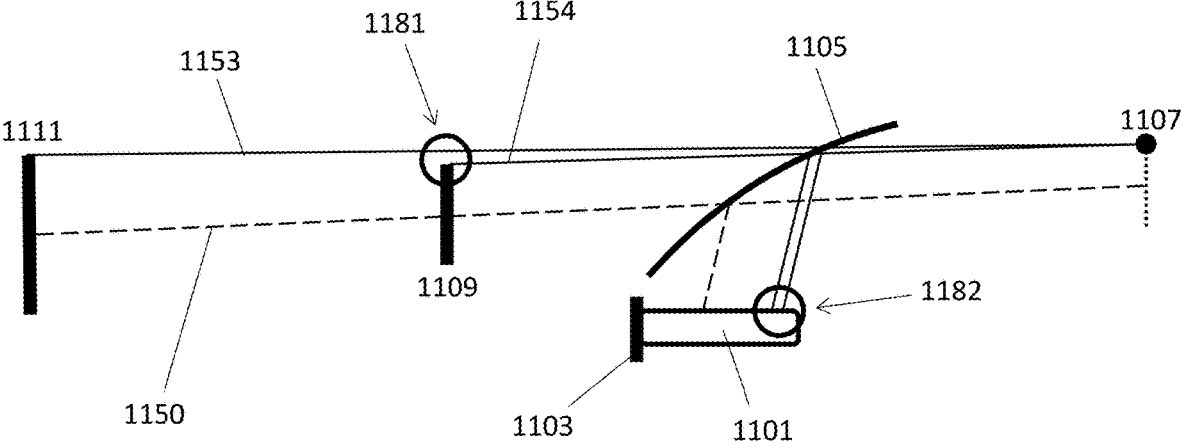
Figure 11C:
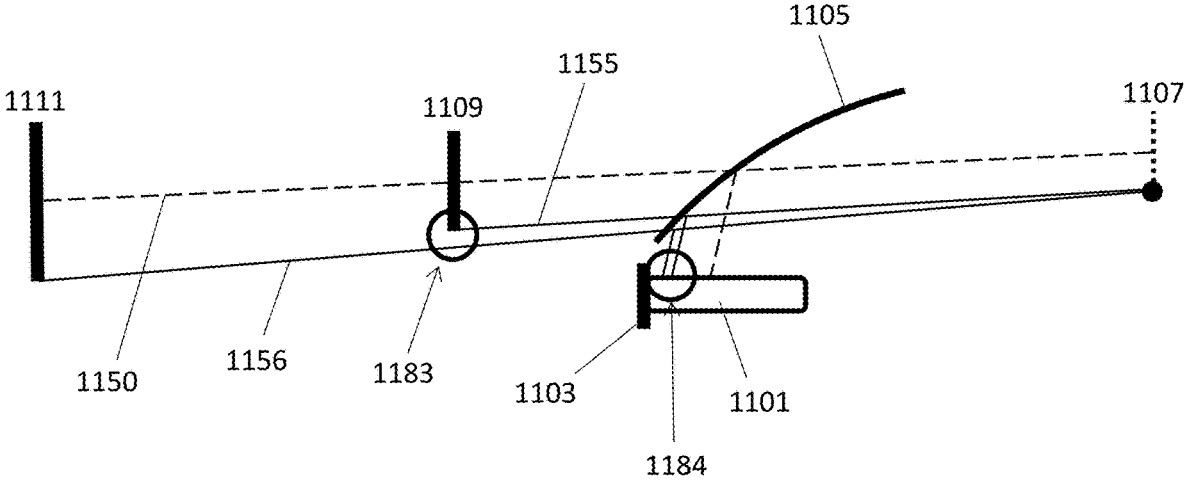

FIGS. 11B and 11C shows the same system but, instead, show corresponding lines from the top and bottom of the eye-box, respectively. FIG. 11B shows a pair of lines that extend from the top of the eye-box 1107 to the top of the near-field virtual image area 1109 and far-field image 1111, respectively. More specifically, third line 1153 is a straight line joining the top of the eye-box 1107 and the top of the far-field virtual image area 1111, and fourth line 1154 is a straight line joining the top of the eye-box 1107 and the top of the near-field virtual image area 1109. The angle between the viewing axis 1150 and the third line 1153 is different to the angle between the viewing axis 1150 and the fourth line 1154. More specifically, in this example, the angle between the viewing axis 1150 and the third line 1153 is greater than to the angle between the viewing axis 1150 and the fourth line 1154. This is because the centers of the two virtual image areas are aligned on the viewing axis and have the same field of view in angular space but the eye-box position is offset in the positive y-direction in relation to the viewing axis 1150.

The angular difference between the third line 1153 and fourth line 1154 has the consequence that the size of the light ray bundle required for each image individually may be different. FIG. 11B highlights a first area 1181 of the optical configuration using a first circle and a second area 1182 of the optical configuration using a second circle. The lines shown in the first area 1181 highlight how much larger in the positive y-direction the light ray bundle must be in order for the top of the far-field image area to receive light from the HUD assembly 1101. Likewise, the lines present in the second area 1182 show how the size of the light ray bundle associated with the far-field image must be greater than that of the near-field image despite the fact that the two virtual images have the same size in angular space (i.e., the same field of view—at least in the plane shown). The lines within the second area 1182 effectively show how much additional clearance volume within the vehicle must be provided for the head-up display in order to form a far-field image having the same angular size as the near-field image.

FIG. 11C shows the corresponding optical geometry from a lower position of the eye-box 1107. FIG. 11C shows a pair of lines that extend from the bottom of the eye-box 1107 to the bottom of the near-field virtual image area 1109 and far-field virtual image area 1111, respectively. More specifically, sixth line 1156 is a straight line joining the bottom of the eye-box 1107 and the bottom of the far-field virtual image area 1111, and fifth line 1155 is a straight line joining the bottom of the eye-box 1107 and the bottom of the near-field virtual image area 1109. The angle between the viewing axis 1150 and the sixth line 1156 is different to the angle between the viewing axis 1150 and the fifth line 1155. More specifically, in this example, the angle between the viewing axis 1150 and the sixth line 1156 is greater than to the angle between the viewing axis 1150 and the fifth line 1155. This is because the centers of the two virtual image areas are aligned on the viewing axis and have the same field of view in angular space but the eye-box position is offset in the negative y-direction in relation to the viewing axis 1150.

The angular difference between the sixth line 1156 and fifth line 1155 has the consequence that the size of the light ray bundle required for each image individually may be different. FIG. 11C highlights a third area 1183 of the optical configuration using a third circle and a fourth area 1184 of the optical configuration using a fourth circle. The lines shown in the third area 1183 highlight how much larger in the negative y-direction the light ray bundle must be in order for the bottom of the far-field virtual image area to receive light from the HUD assembly 1101. Likewise, the lines present in the fourth area 1184 show how the size of the light ray bundle associated with the far-field image must be greater than that of the near-field image despite the fact that the two virtual images have the same size in angular space (i.e., the same field of view—at least in the plane shown). The lines within the fourth area 1184 effectively show how much additional clearance volume within the vehicle must be provided for the head-up display in order to form a far-field image having the same angular size as the near-field image.

FIGS. 11A-C show that the far-field virtual image area effectively necessitates more volume within the vehicle to be reserved for the light ray bundle of the HUD assembly than the near-field virtual image area. This can be understood by considering the boundary (i.e., top and bottom in FIG. 11) eye-box positions. This finding was not expected particularly in the case when the field of view of the far-field virtual image area was no greater than that of the near-field virtual image area.

In an embodiment, which may be understood from FIGS. 11B and 11C, the field of view of the near-field virtual image area is increased to effectively fill the gap between the third line and fourth line, and/or fifth line and sixth line. From the foregoing, it will be understood that this embodiment is advantageous because the field of view of the near-field virtual image area can be increased without affecting the size of the light ray bundle needed to form the images. Larger fields of view are generally desired in head-up display and this embodiment may therefore be implemented without detrimental effect on volume. The inventors identified that this enhancement may be made without consequence.

In this modification of FIGS. 11A-C, it may be said that the field of view of the near-field/first image area is greater than that of the far-field/second image area in at least one direction (e.g., positive direction) of the first dimension (e.g., y-direction). It may also be said that the light ray bundle forming the first image content and second image content is delimited in accordance with the second virtual image area. It may further be said that the angular field of view of the near-field/first image area, in a first dimension (e.g., y-axis) of two orthogonal dimensions (e.g., x and y axes) of the eye-box, is delimited in the plane containing the first dimension and viewing axis (e.g., the yz plane) by a straight line joining one end of the eye-box and the corresponding end of the far-field/second image area (in the same plane). The field of view of the near-field/first image area may also be delimited in this plane by a second straight line joining the opposite end of the eye-box and the corresponding opposite end of the far-field/second image area. In other words, the near-field virtual image area 1109 may be expanded/extended in both directions. Because the near-field virtual image area 1109 is expanded/extended, it may be said that the far-field virtual image area 1111 extends less far, in angular space, than the near-field virtual image area 1109 (in at least one direction of one dimension of the eye-box).

Whilst FIGS. 11A-C show one cross-sectional plane of the system, the reader will understand that the same principles may be applied to the orthogonal plane (e.g., the xz plane). For example, the field of view of the near-field virtual image plane may be expanded/increased in the x-direction/horizontal direction with respect to the far-field virtual image area without increasing the size of the light ray bundle needed to form the two images.

The skilled reader will understand that, in accordance with the above embodiment, the field of view of the near-field virtual image area is increased by increasing the size of the area of the near-field replay field that receives light from the hologram. This may be achieved, for example, by editing the target near-field image (e.g., expanding or increasing the size of the target image) before hologram calculation. Typically, a target image has a content-free border area that surrounds the image content, which is chosen according to application requirements. Thus, by editing the target near-field image prior to hologram calculation, the image content of the near-field virtual image may be extended into the border area in at least one direction so as to increase the size of the near-field/first image area. In consequence, the far-field/second image area extends less far in angular space than the near-field/first image area, as described above.

Figure 12A:
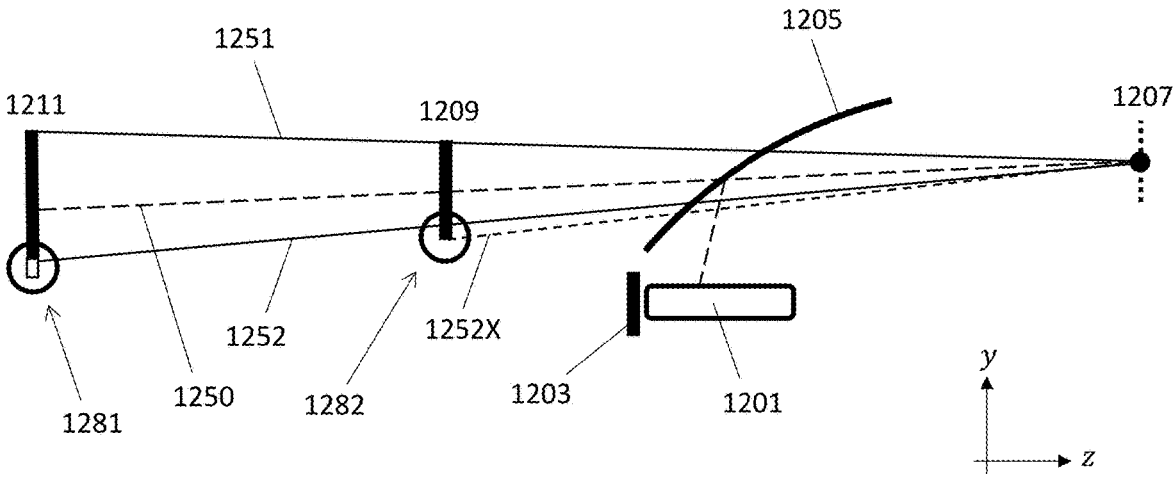
FIGS. 12A, 12B and 12C show how the size of a near-field image or far-field image may be optimized in accordance with some embodiments.
Figure 12B:
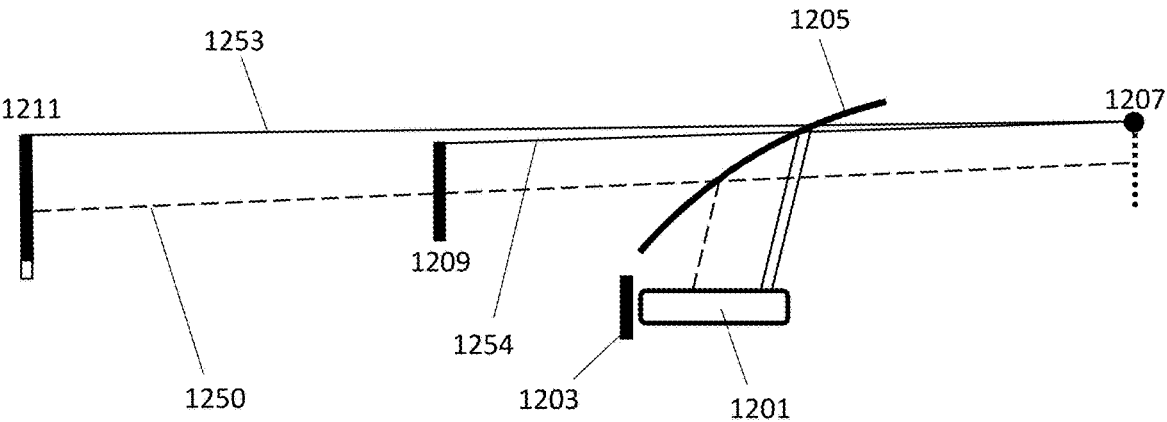
Figure 12C:
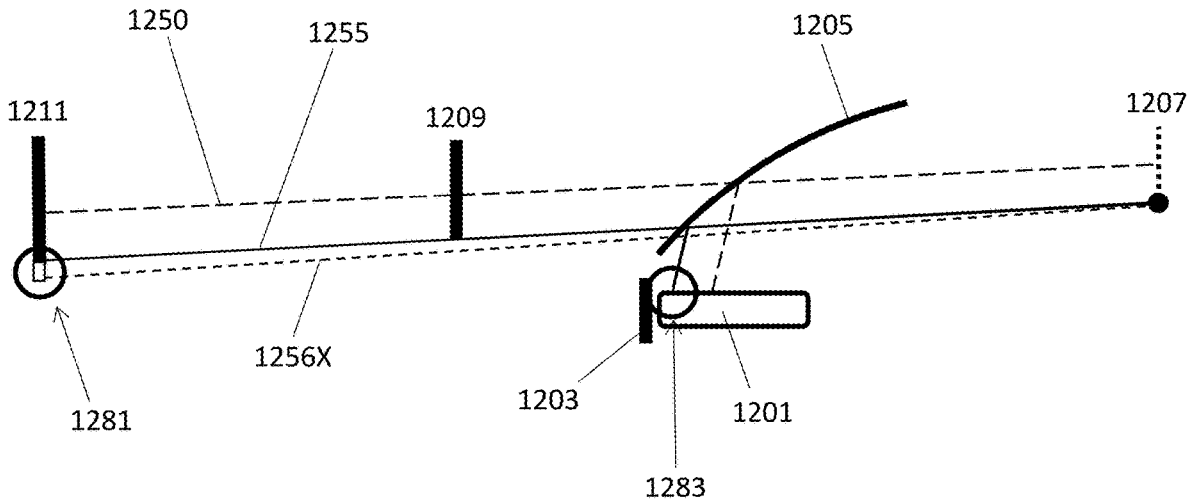

In another embodiment, which may be understood with reference to FIGS. 12A-C, the size of the far-field virtual image area is reduced/cropped in order to reduce/crop the volume of space need within the vehicle for the light ray bundle.

FIGS. 12A-C largely correspond to FIGS. 11A-C. However, FIGS. 12A-C show cropping of the far-field virtual image area 1211 on the lower side, as illustrated (the negative y-direction). Accordingly, the field of view of the far-field virtual image area 1211 in FIGS. 12A-C is less than that of the near-field virtual image area 1209. More specifically, the far-field virtual image area 1209 extends less far than the near-field virtual image area 1211 in one direction of the first dimension (e.g., the negative y-direction).

FIG. 12A shows the yz plane of a system comprising a HUD assembly 1201 housed in a vehicle having a windscreen 1205. FIG. 12A further shows the eye-box 1207 of the head-up display and part of the vehicle assembly 1203 which may be, for the example, part of the plenum of the vehicle. The HUD assembly 1201 must be appropriately size and positioned within e.g., the dashboard to avoid physical conflict with the structure of the vehicle including, for example, the plenum. A viewing axis 1250 of the system is shown as a dotted line from the HUD assembly 1201 to the eye-box 1207 via a reflection off the windscreen 1205. Because the HUD images are reflected off the windscreen 1205 to the viewer/eye-box 1207, the images are virtual— that is, to a viewer position in the eye-box 1207, they appear on the other side of the windscreen 1205, i.e., outside the vehicle. The viewing axis 1250 is extended through the windscreen 1205 to show the location of a near-field virtual image area 1209 and a far-field virtual image area 1211. Near-field image content, such as fuel or speed information, may be displayed in the near-field virtual image area 1209. Far-field image content, such as navigation or warning information, may be displayed in the far-field virtual image area 1211.

FIG. 12A further shows the field of view of a viewer from the center of the eye-box 1207 by way of a first line 1251 and second line 1252 which respectively extend from the center of the eye-box to opposite extremes of the far-field virtual image area 1211 in the yz plane. More specifically, first line 1251 is a straight line joining the center of the eye-box 1207, the top of near-field virtual image area 1209 and the top of far-field virtual image area 1211.

The second line 1252 is a straight line joining the center of the eye-box 1107 and the bottom of far-field virtual image area 1211. In angular terms, the field of view in the vertical direction of the near-field virtual image area plane 1209 is substantially equal to the field of view in the vertical direction of the far-field virtual image area plane 1111 from the center of the eye-box in one direction of the first dimension (e.g., positive y-direction) but unequal in the other direction of the first dimension (e.g., negative y-direction).

A difference between FIGS. 11A and 12A is that the second line 1252 joining the center of the eye-box 1207 and the bottom of the far-field virtual image area 1211 is not aligned with the bottom of the near-field virtual image area 1209. A first area 1281 of FIG. 12A is highlighted by a first circle that shows how the bottom of the far-field virtual image area 1211 is cropped/removed/absent in comparison to FIG. 11A. Dotted line 1252X indicates where the second line 1252 would be positioned if the bottom of the far-field virtual image area 1211 were not cropped (i.e., as per FIG. 11A).

FIGS. 12B and 12C shows the same system as FIG. 12A but, instead, show corresponding lines from the top and bottom of the eye-box, respectively. FIG. 12B shows a pair of lines that extend from the top of the eye-box 1207 to the top of the near-field virtual image area 1209 and far-field image 1211, respectively. More specifically, third line 1253 is a straight line joining the top of the eye-box 1207 and the top of the far-field virtual image area 1211, and fourth line 1254 is a straight line joining the top of the eye-box 1207 and the top of the near-field virtual image area 1209. The angle between the viewing axis 1250 and the third line 1253 is different to the angle between the viewing axis 1250 and the fourth line 1254. More specifically, in this example, the angle between the viewing axis 1250 and the third line 1253 is greater than to the angle between the viewing axis 1250 and the fourth line 1254. This is because the centers of the two virtual image areas are aligned on the viewing axis and have the same field of view in angular space, on this side of the eye-box, but the eye-box position is offset in the positive y-direction in relation to the viewing axis 150.

FIG. 12B corresponds to FIG. 11B in all other ways and again shows how the size of the light ray bundle in one direction (e.g., positive z-direction) is determined by the size/extent of the far-field virtual image area 1211. In this embodiment, the same is not true on the other side of the eye-box/virtual image areas, as can be understood from FIG. 12C.

FIG. 12C shows the corresponding optical geometry from a lower position of the eye-box 1207. The far-field virtual image area is reduced (compared to FIG. 11C) on this side of the eye-box. FIG. 12C shows one line defining the boundary of the field of view of both virtual image areas in this direction (e.g., negative y-direction). More specifically, fifth line 1255 is a straight line joining the bottom of the eye-box 1207, the bottom of the far-field virtual image area 1211 and the bottom of the near-field virtual image area 1209. In this direction of the first dimension (e.g., negative y-direction), the far-field virtual image area 1211 extends less far than the near-field virtual image area (in angular terms/space). Second dotted line 1256X is a straight line joining the bottom of the eye-box and the bottom of the far-field virtual image area 1211. The second dotted line effectively represents a light ray that has been cropped/removed owing to the cropping of the far-field virtual image rea 1211. The angle between the viewing axis 1250 and the fifth line 1255 is less than the angle between the viewing axis 1250 and the second dotted line 1256X which would represent a light ray path if the far-field virtual image area 1211 were not cropped (as per FIG. 11C).

In the embodiment of FIGS. 12A-C, it may also be said that the field of view of the near-field/first image area is greater than that of the far-field/second image area in at least one direction (e.g., negative direction) of the first dimension (e.g., y-direction). It may also be said that light ray bundle forming the first image content and second image content (at substantially the same time) is delimited in accordance with the first virtual image area. It may further be said that the angular field of view of the far-field/second image area, in a first dimension (e.g., y-axis) of two orthogonal dimensions (e.g., x and y axes) of the eye-box, is delimited in the plane containing the first dimension and viewing axis (e.g., the yz plane) by a straight line joining one end of the eye-box and the corresponding end of the near-field/first image area (in the same plane). The field of view of the far-field/second image area may also be delimited in this plane by a second straight line joining the opposite end of the eye-box and the corresponding opposite end of the near-field/first image area. In other words, the far-field virtual image area may be cropped on both sides in order to reduce the size of light ray bundle.

The skilled reader will understand that, in accordance with the embodiment of FIGS. 12A-C, the field of view of the far-field virtual image area is reduced by reducing the size of the area of the far-field replay field that receives light from the hologram. This may be achieved, for example, by editing the target far-field image (e.g., cropping or reducing the size of the target image) before hologram calculation. As noted above, a target image typically has a content-free border area that surrounds the image content. Thus, by editing the target far-field image prior to hologram calculation, the border surrounding the image content of the far-field virtual image may be increased in at least one direction so as to reduce the size of the far-field/second image area. In consequence, the far-field/second image area extends less far in angular space than the near-field/first image area, as described above.

There is therefore commonality between the embodiment described above as a modification of FIGS. 11A-C and the embodiment of FIGS. 12A-C. The commonality is that there is provided a head-up display comprising an eye-box having a first dimension and second dimension, wherein the head-up display is arranged to (simultaneously) form first image content in a first image area at a first image distance (wherein an image distance is a distance perpendicular to a plane containing the first dimension and second dimension) from the eye-box and second image content in a second image area at a second image distance from the eye-box, wherein the first image distance is less than the second image distance and the first image area is at least partially overlapping in the first dimension with the second image area (when viewed from the eye-box/in angular space from the center of the eye-box), wherein second image area extends less far in angular space than the first image area in at least one direction of the first dimension.

Additional Features

Embodiments refer to an electrically-activated LCOS spatial light modulator by way of example only. The teachings of the present disclosure may equally be implemented on any spatial light modulator capable of displaying a computer-generated hologram in accordance with the present disclosure such as any electrically-activated SLMs, optically-activated SLM, digital micromirror device or microelectromechanical device, for example.

In some embodiments, there is provided a vehicle comprising the head-up display of the present disclosure. The vehicle may be an automotive vehicle such as a car, truck, van, lorry, motorcycle, train, airplane, boat, or ship. However, the image projector of the present disclosure may be used in any device comprising an optical combiner to form virtual images. For example, the image projector of this disclosure may also be used to form an improved near-eye device such as glass or head-mounted display.

The methods and processes described herein may be embodied on a computer-readable medium. The term "computer-readable medium" includes a medium arranged to store data temporarily or permanently such as random-access memory (RAM), read-only memory (ROM), buffer memory, flash memory, and cache memory. The term "computer-readable medium" shall also be taken to include any medium, or combination of multiple media, that is capable of storing instructions for execution by a machine such that the instructions, when executed by one or more processors, cause the machine to perform any one or more of the methodologies described herein, in whole or in part.

The term "computer-readable medium" also encompasses cloud-based storage systems. The term "computer-readable medium" includes, but is not limited to, one or more tangible and non-transitory data repositories (e.g., data volumes) in the example form of a solid-state memory chip, an optical disc, a magnetic disc, or any suitable combination thereof. In some example embodiments, the instructions for execution may be communicated by a carrier medium. Examples of such a carrier medium include a transient medium (e.g., a propagating signal that communicates instructions).

It will be apparent to those skilled in the art that various modifications and variations can be made without departing from the scope of the appended claims. The present disclosure covers all modifications and variations within the scope of the appended claims and their equivalents.

The invention claimed is:

1. A head-up display comprising an eye-box having a first dimension and a second dimension, wherein the head-up display is arranged to form first image content in a first image area at a first image area distance from the eye-box and second image content in a second image area at a second image area distance from the eye-box, wherein the first image area distance is less than the second image area distance and the first image area is at least partially overlapping in the first dimension with the second image area, and wherein the second image area extends less far in angular space than the first image area in both directions of the first dimension such that a size of the second image area in angular space is no more than that of the first image area.

2. The head-up display of claim 1, wherein the first image content and the second image content are formed from a display pattern displayed on a display device comprising a spatial light modulator.

3. The head-up display of claim 2, wherein the display pattern is a diffractive pattern such as a hologram.

4. The head-up display of claim 3, wherein the diffractive pattern comprises one or more of a Fourier hologram, a Fresnel hologram, a point cloud hologram, or a combination thereof.

5. The head-up display of claim 2, wherein the first image content and the second image content are simultaneously formed from a common display pattern displayed on the display device.

6. The head-up display of claim 5, wherein the common display pattern is a diffractive pattern.

7. The head-up display of claim 1, wherein at least one of (i) the first image content comprises first virtual image content or (ii) the second image content comprises second virtual image content.

8. The head-up display of claim 1, wherein the second image area extends no further in angular space than the first image area in at least one direction of the first dimension from all positions within the eye-box such that light rays forming the first image content and the second image content are delimited such that they are displayed within a volume of space defined by the first image area.

9. The head-up display of claim 1, wherein the first dimension is a vertical direction.

10. The head-up display of claim 1, wherein a center of the first image area in the second dimension is substantially aligned with a center of the second image area in the second dimension.

11. The head-up display of claim 1, wherein the second dimension is a horizontal direction.

12. The head-up display of claim 1, wherein the first image area is at least partially overlapping in the first dimension with the second image area, and wherein the second image area extends no further in angular space than the first image area in at least one direction of the first dimension from all positions within the eye-box.

13. The head-up display of claim 1, wherein at least one of (i) the first image distance is less than 5 meters or (ii) the second image distance is less than 20 meters.

14. The head-up display of claim 1, wherein at least one of (i) the first image distance is less than 3 meters or (ii) the second image distance is less than 15 meters.

15. The head-up display of claim 1, wherein at least one of (i) an angular field of view of the head-up display in the second dimension is in a range of about 5 to 25 degrees or (ii) the angular field of view of the head-up display in the first dimension is about 3 to 10 degrees.

16. The head-up display of claim 1 further comprising a user-tracking system, wherein the head-up display is arranged to determine a display pattern in real-time at least partially based on an eye-box position within the eye-box determined by the user-tracking system.

17. The head-up display of claim 16, wherein the user-tracking system comprises an eye-tracking system.

18. A method of displaying image content, wherein the method is performed by a head-up display comprising an eye-box having a first dimension and a second dimension, wherein the head-up display is arranged to form first image content in a first image area at a first image area distance from the eye-box and second image content in a second image area at a second image area distance from the eye-box, wherein the first image area distance is less than the second image area distance and the first image area is at least partially overlapping in the first dimension with the second image area, wherein the second image area extends less far in angular space than the first image area in both directions of the first dimension such that a size of the second image area in angular space is no more than that of the first image area, wherein the head-up display further comprises a user-tracking system, wherein the head-up display is arranged to determine a display pattern in real-time at least partially based on an eye- box position within the eye-box determined by the user-tracking system, and wherein the method comprises:

changing at least one of the first and second image area distance based on a change to the eye-box position determined by the user-tracking system.

19. The method of displaying image content of claim 18, wherein the first image content and the second image content are formed from a diffractive pattern displayed on a display device comprising a spatial light modulator of the head-up display, wherein at least one of the first and second image area distance is changed by changing at least one lens function associated with the diffractive pattern.

* * * * *